US 6,698,896 B2

(12) United States Patent
Suzuki et al.

(10) Patent No.: US 6,698,896 B2
(45) Date of Patent: Mar. 2, 2004

(54) COLOR-SEPARATING AND -RECOMBINING OPTICAL SYSTEM AND PROJECTION DISPLAY USING THE SAME

(75) Inventors: Tetsuji Suzuki, Yokosuka (JP); Tsutou Asakura, Odawara (JP)

(73) Assignee: Victor Company of Japan, Ltd. (JP)

( * ) Notice: Subject to any disclaimer, the term of this patent is extended or adjusted under 35 U.S.C. 154(b) by 33 days.

(21) Appl. No.: 10/042,607

(22) Filed: Jan. 9, 2002

(65) Prior Publication Data

US 2002/0097382 A1 Jul. 25, 2002

(30) Foreign Application Priority Data

| Jan. 19, 2001 | (JP) | 2001-011544 |
| Feb. 1, 2001 | (JP) | 2001-025505 |
| May 29, 2001 | (JP) | 2001-160220 |

(51) Int. Cl.[7] .......... G03B 21/00; G03B 21/14; G03B 21/28; G03B 5/04; G02F 1/1335
(52) U.S. Cl. ............. 353/33; 353/20; 353/31; 353/37; 353/81; 349/9; 359/834
(58) Field of Search ................ 353/20, 31, 33, 353/34, 37, 98, 99, 81, 82; 349/9, 5, 7, 8; 359/834

(56) References Cited

U.S. PATENT DOCUMENTS

| 5,751,384 A | 5/1998 | Sharp ............. 349/18 |
| 6,183,091 B1 | 2/2001 | Johnson et al. ............. 353/20 |
| 6,309,071 B1 * | 10/2001 | Huang et al. ............. 353/31 |
| 6,419,362 B1 * | 7/2002 | Ikeda et al. ............. 353/20 |
| 2002/0105619 A1 * | 8/2002 | Lin ............. 353/20 |

OTHER PUBLICATIONS

SID'00 Digest. vol. 31, p. 92, 9.3 / High Contrast Color Splitting Architecture Using Color Polarization Filters by Robinson et al., pp. 1–4, Publication Date: Apr. 2000.

* cited by examiner

Primary Examiner—Russell Adams
Assistant Examiner—Melissa J. Koval
(74) Attorney, Agent, or Firm—Renner, Kenner, Greive, Bobak, Taylor & Weber

(57) ABSTRACT

A color-separating and -recombining optical system includes a cubic- or square column-like first to fourth polarization beam splitters having polarization-splitting planes intersecting each other and wavelength-selective polarizing converters for rotating the plane of polarization of a specific-color light component by 90 degrees. One of the converters is placed at a light-incident side of the first splitter and another is placed at a light-emitting side of the fourth splitter. The first and fourth splitters are provided at light-incident and light-emitting sides, respectively, of the optical system. The first and fourth splitters are arranged diagonally opposing each other. The remaining converters are placed between at least two inner facing planes of the first to fourth splitters. At least the remaining converters and three of the first to fourth splitters are joined to form an optical joint component with a gap between the component and the remaining one splitter.

7 Claims, 12 Drawing Sheets

| LIGHT SOURCE | SAMPLE | PBS-OPTO-ELASTIC CONSTANT ($10^{-8} cm^2/N$) | | | | RESULTS |
|---|---|---|---|---|---|---|
| | | 1ST | 2ND | 3RD | 4TH | |
| 100 W | SAMPLE 1 | 2.77(BK7) | 2.77(BK7) | 2.77(BK7) | 2.77(BK7) | △ |
| | SAMPLE 2 | 1.8(SF1) | 2.77(BK7) | 2.77(BK7) | 2.77(BK7) | ○ |
| | SAMPLE 3 | 1.36(SF4) | 2.77(BK7) | 2.77(BK7) | 2.77(BK7) | ◎ |
| 150 W | SAMPLE 4 | 2.77(BK7) | 2.77(BK7) | 2.77(BK7) | 2.77(BK7) | × |
| | SAMPLE 5 | 1.8(SF1) | 1.8(SF1) | 1.8(SF1) | 2.77(BK7) | △ |
| | SAMPLE 6 | 1.36(SF4) | 1.36(SF4) | 1.36(SF4) | 2.77(BK7) | ○ |
| | SAMPLE 7 | 1.36(SF4) | 1.8(SF1) | 1.8(SF1) | 2.77(BK7) | ○ |
| | SAMPLE 8 | 0.65(PBH6W) | 2.62(SF2) | 2.62(SF2) | 2.62(SF2) | ○ |
| | SAMPLE 9 | 0.65(PBH6W) | 1.8(SF1) | 1.8(SF1) | 2.62(SF2) | ◎ |
| 200 W | SAMPLE 10 | 1.8(SF1) | 1.8(SF1) | 1.8(SF1) | 1.8(SF1) | × |
| | SAMPLE 11 | 0.65(PBH6W) | 2.62(SF2) | 2.62(SF2) | 2.62(SF2) | △ |
| | SAMPLE 12 | 0.65(PBH6W) | 1.8(SF1) | 1.8(SF1) | 2.62(SF2) | ○ |
| | SAMPLE 13 | 0.65(PBH6W) | 0.65(PBH6W) | 0.65(PBH6W) | 2.62(SF2) | ◎ |
| | SAMPLE 14 | 0.03(PBH55) | 0.65(PBH6W) | 0.65(PBH6W) | 0.65(PBH6W) | ◎ |
| | SAMPLE 15 | 0.03(PBH55) | 0.03(PBH55) | 0.03(PBH55) | 2.62(SF2) | ◎ |

FIG.11

| (GRADE) | | (EVALUATION CRITERIA) |
|---|---|---|
| 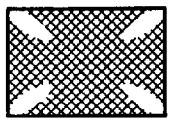 | × | USELESS DUE TO MUCH BIREFRINGENCE |
| 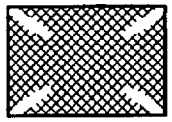 | △ | USEFUL ONLY FOR LOW-QUALITY PROJECTION DISPLAY |
| 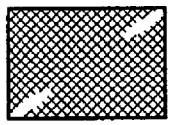 | ○ | BIREFRINGENCE NOTICED BY CLOSE OBSERVATION |
| 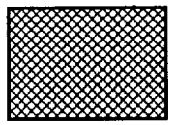 | ◎ | NO BIREFRINGENCE OBSERVED |

FIG.12

COLOR-SEPARATING AND -RECOMBINING OPTICAL SYSTEM AND PROJECTION DISPLAY USING THE SAME

BACKGROUND OF THE INVENTION

The present invention relates a color-separating and -recombining optical system having polarization beam splitters and a projection display using the optical system.

Color projection displays operate as follows: White light is separated into three primary colors R (Red), G (Green) and B (blue). The separated color components are guided to the corresponding spatial light modulators (abbreviated to SLM hereinafter) for optical modulation in accordance with a video signal. The modulated color components are recombined and projected onto a screen, thus displaying a color image thereon.

Color projection displays are classified into three types in accordance with SLMs to be used, such as, a type with SLMs, another with reflecting SLMs, and still another with a DMD (Digital Mirror Device).

Compact projection displays with transparent SLMs and DMDs having relatively simple optical architecture are available but have difficulty in resolution.

On the contrary, reflective SLMs exhibit high resolution but pose a problem in compactness due to complex optical system using this type of SLMs. Particularly, projection displays equipped with reflective SLMs require polarization beam splitters (abbreviated to PBS hereinafter) for splitting light beams incident to the SLMs and reflected light beams that have been modulated by the SLMs. In detail, each reflective SLM requires two or more of PBSs for high contrast, thus resulting in complex optical architecture for reflective projection displays.

Colorlink Inc. (US) has proposed a color-separating and -recombining optical system having no problem on optical architecture in use of reflective LSMs, introduced in literature "High Contrast Color Splitting Architecture Using Color Polarization Filters" by Michael G. Robinson et., SID 00 DIGEST, 92-95 (2000).

FIG. 1 is a plan view illustrating an optical architecture for a projection display 300 using reflective SLMs, proposed by Colorlink Inc.

A color-separating and -recombining optical system 290 (enclosed by a dot line) has cubic- or square column-like first to fourth PBSs 102, 103, 104 and 105 arranged such that polarization-splitting planes 121, 131, 141 and 151 intersect each other almost like the character "X".

First wavelength-selective polarizing converters (G-phase plates) 106 and 107 are provided on the light-incident plane side of the first PBS 102 (the left side of the PBS 102 in FIG. 1) and light-emitting plane side of the fourth PBS 105 (the right side of the PBS 105 in FIG. 1), respectively, for rotating the plane of polarization of a G-linearly-polarized light by 90 degrees.

Second wavelength-selective polarizing converters (R-phase plates) 108 and 109 are provided between the first and the third PBSs 102 and 104, and the third and the fourth PBSs 104 and 105, respectively, for rotating the plane of polarization of a R-linearly-polarized light by 90 degrees.

Linearly-polarized light is classified into S-polarized light and P-polarized light. A polarized light is decided as S- or P-polarized light in accordance with relativity between its plane of polarization and a polarization-splitting plane of a PBS to which it is incident. In other words, a polarized light is called S-polarized light when its plane of polarization is orthogonal to an incident plane against a polarization-splitting plane of a PBS, whereas it is called P-polarized light when its plane of polarization is horizontal to the incident plane.

The projection display 300 has a relatively simple optical architecture for high contrast even though it requires three PBSs for each reflective SLM.

Nonetheless, this projection display has a problem of low contrast at the corners of a black image screen due to birefringence caused by a transparent material for the PBSS due to wrong choice for the transparent material in the projection display 300 when a high-intensity discharge lamp of 100 W or more is used.

Japanese-Unexamined Patent Publication No. 9-54213 discloses that a transparent material of $1.5 \times 10^{-8}$ cm$^2$/N or less as the absolute value of opto-elastic constant is suitable for such PBSs.

It is disclosed that a transparent material of low opto-elastic constant is suitable at least for a main (reflective) PBS that splits incident light and light reflected therefrom after modulation.

The inventors of the present invention have, however, found that the problem discussed above cannot be solved by employing such transparent material of low opto-elastic constant when it is used only for the main PBSs (the second and the third PBSs 103 and 104) for the projection display 300 equipped with the color-separating and -recombining optical system 290.

The above problem could be solved by employing such transparent material of low opto-elastic constant when it is used for all of the four PBSs, which, however, results in high cost for the color-separating and -recombining optical system.

Such transparent material of low opto-elastic constant is generally several times or several ten times more expensive than usual optical glass such as BK7 because it contains much lead and hence too weak and soft for machining.

Moreover, the color-separating and -recombining optical system 290, offered by Colorlink Inc., has revealed low reliability because all optical elements of the optical system 290 joined by an adhesive were peeled off from each other at a thermal-cyclic reliability test.

The following is a possible reason for low reliability:

As already described, the color-separating and recombining optical system 290 has four PBSs 102, 103, 104 and 105 arranged such that their polarization-splitting planes 121, 131, 141 and 151 intersect each other almost like the character "X".

In the reliability test, the optical elements were subjected to thermal expansion and contraction while the optical system 290 were being heated and cooled cyclically. Stress was then generated from the center of the intersection of the four PBSs in the direction of circumference due to thermal expansion and contraction. The circumferential stress could cause outward shear stress in heating whereas tensile stress in cooling at each joint section of the optical elements, thus resulting is peeling-off for the optical elements from each other.

The character-"X"-like arrangements of the PBSs 102, 103, 104 and 105 also poses the following problem:

As illustrated in FIG. 2, some components of light incident to the first PBS (light-incident-side PBS) 102 are further incident to the fourth PBS (light-emitting-side PBS) 105. The unnecessary light components L are projected onto a screen (not shown) via a projection lens 191, to generate bright portions on the screen, thus resulting in low quality for images displayed thereon. The image quality will be further lowered when the four PBSs 102, 103, 104 and 105 are bonded each other by a joint material 110 such as a transparent adhesive.

When the color-separating and -recombining optical system 290 has integrators on reflective SLMs 161, 162 and 163 at the light-source side, an integrator-segment image is displayed on screen while light is illuminating these SLMs. However, light components spread over the periphery of each reflective SLM could also become the unnecessary light components L projected onto the screen.

In addition, light components reflected from the reflective SLMs 161, 162 and 163 could be reflected again at a first polarizing plate 181 and become the unnecessary light components L projected onto the screen.

SUMMARY OF THE INVENTION

Under consideration of the problems discussed above, a purpose of the present invention is to provide a low-cost but highly-reliable color-separating and -recombining optical system having polarization beam splitters unsusceptible to birefringence, suitable for use in reflective projection display.

Another purpose of the present invention is to provide a high-image-quality color-separating and -recombining optical system with a function of preventing unnecessary light components being displayed on a screen and a projection display using this optical system.

The present invention provides a color-separating and -recombining optical system comprising: cubic- or square column-like first to fourth polarization beam splitters having polarization-splitting planes intersecting each other like a character-"X"; and wavelength-selective polarizing converters each for rotating the plane of polarization of a specific-color light component by 90 degrees, one of the converters being placed at a light-incident side of the first splitter, another of the converters being placed at a light-emitting side of the fourth splitter, the first and the fourth splitters being provided at a light-incident side and a light-emitting side, respectively, of the optical system, the first and the fourth splitters being arranged as diagonally opposing each other, and the remaining converters being placed between at least two inner facing planes of the first to the fourth splitters, wherein at least the remaining converters and three of the first to the fourth splitters are joined each other to form an optical joint component with a gap between the remaining one splitter.

Moreover, the present invention provides a color-separating and -recombining optical system comprising: cubic- or square column-like first to fourth polarization beam spltters having polarization-splitting planes intersecting each other like a character-"X"; and wavelength-selective polarizing converters each for rotating the plane of polarization of a specific-color light component by 90 degrees, one of the converters being placed at a light-incident side of the first splitter, another of the converters being placed at a light-emitting side of the fourth splitter, the first and the fourth splitters being provided at a light-incident side and a light-emitting side, respectively, of the optical system, the first and the fourth splitters being arranged as diagonally opposing each other, and the remaining converters being placed between at least two inner facing planes of the first to the fourth splitters, wherein opto-elastic constants for the first to the fourth splitters have a relationship $Ki<Km$ and $Ko$, $Ki$ and $Km<Ko$ or $Ki<Km<Ko$ in which $Ki$, $Km$ and $Ko$ denote the opto-elastic constants for the first splitter, the second and the third splitters and the fourth splitter, respectively.

Moreover, the present invention provides a colorseparating and -recombining optical system comprising: cubic- or square column-like first to fourth polarization beam spltters having polarization-splitting planes intersecting each other like a character-"X"; wavelength-selective polarizing converters each for rotating the plane of polarization of a specific-color light component by 90 degrees, one of the converters being placed at a light-incident side of the first splitter, another of the converters being placed at a light-emitting side of the fourth splitter, the first and the fourth splitters being provided at a light-incident side and a light-emitting side, respectively, of the optical system, the first and the fourth splitters being arranged as diagonally opposing each other, and the remaining converters being placed between at least two inner facing planes of the first to the fourth splitters; and a light blockage provided at an intersection of the polarization-splitting planes and surrounded by the first to the fourth splitters, the light blockage preventing light leakage from the first to the fourth splitters.

Furthermore, the present invention provides a color-separating and -recombining optical system comprising: cubic-or square column-like first to fourth polarization beam splitters having polarization-splitting planes intersecting each other like a character-"X"; wavelength-selective polarizing converters each for rotating the plane of polarization of a specific-color light component by 90 degrees, one of the converters being placed at a light-incident side of the first splitter, another of the converters being placed at a light-emitting side of the fourth splitter, the first and the fourth splitters being provided at a light-incident side and a light-emitting side, respectively, of the optical system, the first and the fourth splitters being arranged as diagonally opposing each other, and the remaining converters being placed between at least two inner facing planes of the first to the fourth splitters; and first light blockages provided at a first corner of the cubic- or square column-like first splitter and a second corner of the cubic- or square column-like fourth splitter, edges of the first and the second corners diagonally opposing each other being cut off to be flat to face each other, the first light blockages preventing light leakage from the first to the fourth splitters.

Moreover, the present invention provides a projection display comprising: a light source for emitting unlinearly-polarized light; a first polarizer to allow only a first specific-linearly-polarized light component of the unlinearly-polarized light to pass therethrough; a color-separating and -recombining optical system including cubic- or square column-like first to fourth polarization beam splitters having polarization-splitting planes intersecting each other like a character-"X ", the first splitter being provided as facing the first polarizer, and wavelength-selective polarizing converters each for rotating the plane of polarization of a specific-color light component by 90 degrees, one of the converters being placed at a light-incident side of the first splitter, another of the converters being placed at a light-emitting side of the fourth splitter, the first and the fourth splitters being provided at a light-incident side and a light-emitting side, respectively, of the optical system, the first and the fourth splitters being arranged as diagonally opposing each other, and the remaining converters being placed between at least two inner facing planes of the first to the fourth splitters, wherein at least the remaining converters and three of the first to the fourth splitters are joined each other to form an optical joint component with a gap between the remaining one splitter; reflective spatial light modulators for light modulation in accordance with a video signal, provided outside the optical system, as facing each light-passing plane of the second and the third splitters, a second polarizer provided as facing a light-emitting side plane of the fourth splitter, to allow only a second specific-linearly-polarized light component emitted from the light-emitting side plane of the fourth splitter to pass therethrough; and a projection lens provided as facing the second polarizer, to receive the second specific-linearly-polarized light component for image projection.

Furthermore, the present invention provides a projection display comprising: a light source for emitting unlinearly-polarized light; a first polarizer to allow only a first specific-linearly-polarized light component of the unlinearly-polarized light to pass therethrough; a color-separating and -recombining optical system including cubic- or square column-like first to fourth polarization beam splitters having polarization-splitting planes intersecting each other like a character-"X", the first splitter being provided as facing the first polarizer, and wavelength-selective polarizing converters each for rotating the plane of polarization of a specific-color light component by 90 degrees, one of the converters being placed at a light-incident side of the first splitter, another of the converters being placed at a light-emitting side of the fourth splitter, the first and the fourth splitters being provided at a light-incident side and a light-emitting side, respectively, of the optical system, the first and the fourth splitters being arranged as diagonally opposing each other, and the remaining converters being placed between at least two inner facing planes of the first to the fourth splitters, wherein opto-elastic constants for the first to the fourth splitters have a relationship Ki<Km and Ko, Ki and Km<Ko or Ki<Km<Ko in which Ki, Km and Ko denote the opto-elastic constants for the first splitter, the second and the third splitters and the fourth splitter, respectively; reflective spatial light modulators for light modulation in accordance with a video signal, provided outside the optical system, as facing each light-passing plane of the second and the third splitters, a second polarizer provided as facing a light-emitting side plane of the fourth splitter, to allow only a second specific-linearly-polarized light component emitted from the light-emitting side plane of the fourth splitter to pass therethrough; and a projection lens provided as facing the second polarizer, to receive the second specific-linearly-polarized light component for image projection.

Furthermore, the present invention provides a projection display comprising: a light source for emitting unlinearly-polarized light; a first polarizer to allow only a first specific-linearly-polarized light component of the unlinearly-polarized light to pass therethrough; a color-separating and -recombining optical system including cubic- or square column-like first to fourth polarization beam splitters having polarization-splitting planes intersecting each other like a character-"X", the first splitter being provided as facing the first polarizer, wavelength-selective polarizing converters each for rotating the plane of polarization of a specific-color light component by 90 degrees, one of the converters being placed at a light-incident side of the first splitter, another of the converters being placed at a light-emitting side of the fourth splitter, the first and the fourth splitters being provided at a light-incident side and a light-emitting side, respectively, of the optical system, the first and the splitters being arranged as diagonally opposing each other, and the remaining converters being placed between at least two inner facing planes of the first to the fourth splitters, and a light blockage provided at an intersection of the polarization-splitting planes and surrounded by the first to the fourth splitters, the light blockage preventing light leakage from the first to the fourth splitters; reflective spatial light modulators for light modulation in accordance with a video signal, provided outside the optical system, as facing each light-passing plane of the second and the third splitters, a second polarizer provided as facing a light-emitting side plane of the fourth splitter, to allow only a second specific-linearly-polarized light component emitted from the light-emitting side plane of the fourth splitter to pass therethrough; and a projection lens provided as facing the second polarizer, to receive the second specific-linearly-polarized light component for image projection.

Furthermore, the present invention provides a projection display comprising: a light source for emitting unlinearly-polarized light; a first polarizer to allow only a first specific-linearly-polarized light component of the unlinearly-polarized light to pass therethrough; a color-separating and -recombining optical system including cubic- or square column-like first to fourth polarization beam splitters having polarization-splitting planes intersecting each other like a character-"X", the first splitter being provided as facing the first polarizer, wavelength-selective polarizing converters each for rotating the plane of polarization of a specific-color light component by 90 degrees, one of the converters being placed at a light-incident side of the first splitter, another of the converters being placed at a light-emitting side of the fourth splitter, the first and the fourth splitters being provided at a light-incident side and a light-emitting side, respectively, of the optical system, the first and the splitters being arranged as diagonally opposing each other, and the remaining converters being placed between at least two inner facing planes of the first to the fourth splitters, and light blockages provided at a first corner of the cubic- or square column-like first splitter and a second corner of the cubic- or square column-like fourth splitter, edges of the first and the second corners diagonally opposing each other being cut off to be flat to face each other, the light blockages preventing light leakage from the first to the fourth splitters; reflective spatial light modulators for light modulation in accordance with a video signal, provided outside the optical system, as facing each light-passing plane of the second and the third splitters, a second polarizer provided as facing a light-emitting side plane of the fourth splitter, to allow only a second specific-linearly-polarized light component emitted from the light-emitting side plane of the fourth splitter to pass therethrough; and a projection lens provided as facing the second polarizer, to receive the second specific-linearly-polarized light component for image projection.

BRIEF DESCRIPTION OF DRAWINGS

FIG. 11 shows results of the birefringence experiments for 15 sample CSR optical systems made of several glass types different in opto-elastic constant for polarization beam splitters;

FIG. 12 indicates evaluation criteria for the birefringence experiments and also illustrating birefringence-evaluation models;

DETAILED DESCRIPTION OF PREFERRED EMBODIMENTS

Preferred embodiments according to the present invention will be disclosed with reference to the attached drawings.

[First Embodiment]

Figure 3:
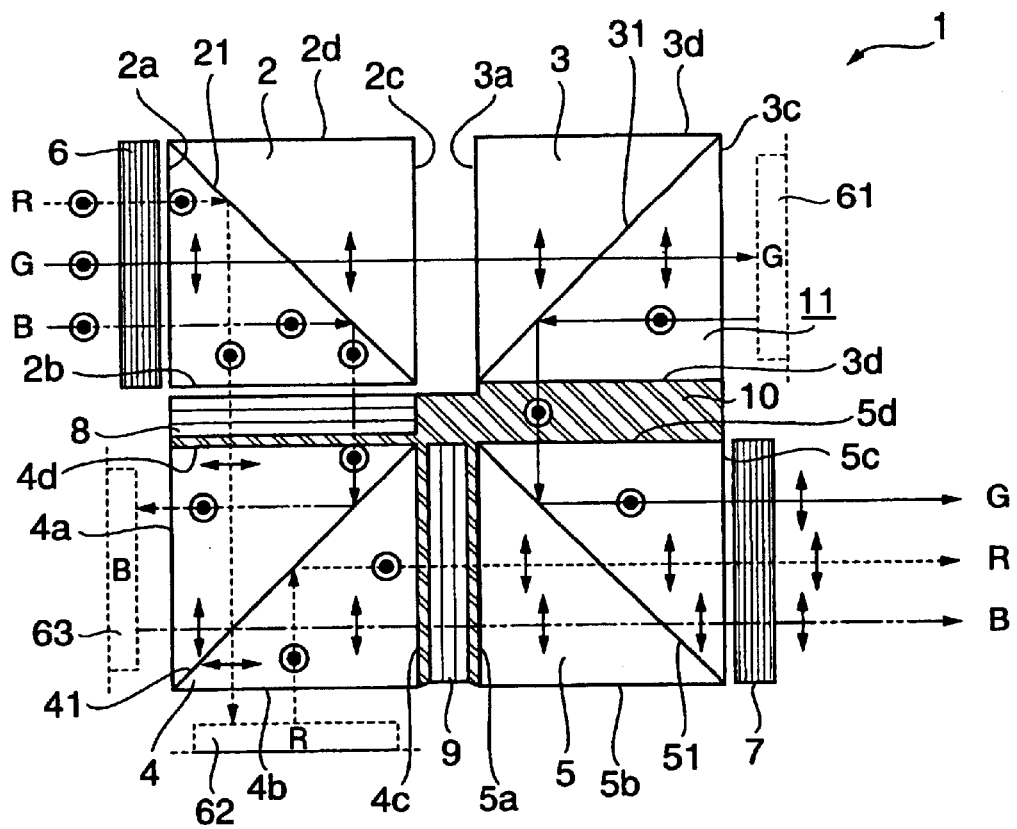
FIG. 3 is a plan view illustrating the first embodiment of a color-separating and -recombining (CSR) optical system according to the present invention.

FIG. 3 is a plan view illustrating the first embodiment of a color-separating and -recombining optical system according to the present invention.

A color-separating and -recombining optical system (abbreviated to CSR optical system hereinafter) 1 has cubic- or square column-like first to fourth polarization beam splitters (abbreviated to PBS hereinafter) 2, 3, 4 and 5 arranged such that polarization-splitting planes 21, 31, 41 and 51 intersect each other almost like the character "X".

The first PBS 2 is a light-incident-side PBS whereas the opposing fourth PBS 5 is a light-emitting-side PBS. It is a matter of choice as to which beam splitter is set as the light-incident-side PBS. One requirement is that any PBS that opposes the light-incident-side PBS be set as the light-emitting-side PBS.

A first wavelength-selective polarizing converter (G-phase plate) 6 is provided in front of a light-passing plane 2a (the light-incident plane side) selected from among light-passing planes 2a, 2b, 2c and 2d of the first PBS (light-incident-side PBS) 2. Another first wavelength-selective polarizing converter (G-phase plate) 7 is provided behind a light-passing plane 5c (the light-emitting plane side) selected from among light-passing planes 5a, 5b, 5c and 5d of the fourth PBS (light-emitting-side PBS) 5. Each wavelength-selective polarizing converter rotates the plane of polarization of G-linearly-polarized light by 90 degrees.

Second wavelength-selective polarizing converters (R-phase plates) 8 and 9 are provided between the first and the third PBSs 2 and 4, and the third and the fourth PBSs 4 and 5, respectively, for rotating the plane of polarization of a R-linearly-polarized light by 90 degrees.

Except the G-phase plate 6 and also the first PBS 2, the G-phase plate 7, the R-phase plates 8 and 9 and the second to fourth PBSs 3 to 5 are joined each other by a joint material 10 such as an adhesive to form an optical joint component 11.

The G-phase plate 6 and the first PBS 2 may be attached to each other or separated as shown in FIG. 3 with a gap. It is also preferable that the R-phase plate 8 is attached to the first PBS 2 whereas it is separated from the third PBS 4.

A spatial light modulator (SLM) 61 for G-light component is placed at the side of a light-passing plane 3c of the second PBS 3. Placed as facing a light-passing plane 4b of the third PBS 4 is an SLM 62 for R-light component. Moreover, an SLM 63 for B-light component is placed at the side of a light-passing plane 4a of the third PBS 4.

The CSR optical system 1 as the first embodiment of the present invention separates R-, G- and B-light components from white light and recombines them as follows:

The S-polarized light of the white light is incident to the G-phase plate 6 for rotating the plane of polarization of G-light component only by 90 degrees. Among the light components of the white light passed through the G-phase plate 6, the G-light component (solid line in FIG. 3) only is converted from the S-polarized light to P-polarized light due to polarization conversion. R-light component (one-dot dashed line in FIG. 3) and B-light component (two-dot dashed line in FIG. 3) remain unchanged as the S-polarized light.

The transition of light path and plane of polarization will be explained for each of R-, G- and B-light components.

Explained first is the G-light component that has passed through the G-phase plate 6.

The G-light component (solid line) has been converted into the P-polarized light as described above. The G-light component passes through the polarization-splitting planes 21 and 31 of the first and the second PBSs 2 and 3, respectively. The G-light component is emitted from a light-passing plane 3c and incident to the reflective SLM 61 for light modulation in accordance with a video signal corresponding to the G-light component. The modulated G-light component returns to the polarization-splitting plane 31 of the second PBS 3.

The S-polarized light generated for the G-light component due to light modulation is reflected at the polarization-splitting plane 31 towards the polarization-splitting plane 51 of the fourth PBS 4. The G-light component (S-polarized light) is reflected at the polarization-splitting plane 51 and emitted from a light-passing plane 5c of the fourth PBS 4, and thus being incident to the G-phase plate 7 for rotating the plane of polarization of the G-light component only by 90 degrees. The S-polarized light of the G-light component is thus converted into S-polarized light and emitted from the G-phase plate 7.

Explained next is the R-light component (one-dot dashed line).

The R-light component (S-polarized light) that has passed through the G-phase plate 6 is reflected at the polarization-splitting plane 21 of the first PBS 2 and incident to the R-phase plate 8 for rotating the plane of polarization of R-light component only by 90 degrees. The S-polarized light for the R-light component is thus converted into P-polarized light and emitted from the R-phase plate 8.

The R-light component (P-polarized light) then passes through the polarization-splitting plane 41 and emitted from a light-passing plane 4b of the third PBS 4. The emitted R-light component is incident to the reflective SLM 62 for light modulation in accordance with a video signal corresponding to the R-light component.

The S-polarized light generated for the R-light component due to light modulation is reflected at the polarization-splitting plane 41 of the third PBS 3 towards the R-phase plate 9 for rotating the plane of polarization of R-light component only by 90 degrees. The S-polarized light of the R-light component is thus converted into P-polarized light and incident to the fourth PBS 5.

The R-light component (P-polarized light) passes through the polarization-splitting plane 51 and is emitted from the light-passing plane 5c of the fourth PBS 4. The emitted R-light component is incident to the G-phase plate 7. The R-light component (P-polarized light) incident to the G-phase plate 7 is not subjected to rotation of polarization plane as described above, and hence emitted therefrom as the P-polarized light.

Explained further is the B-light component (two-dot dashed line).

The B-light component (S-polarized light) that has passed through the G-phase plate 6 is reflected at the polarization-splitting plane 21 of the first PBS 2 and incident to the R-phase plate 8. The B-light component (S-polarized light) incident to the R-phase plate 8 is not subjected to rotation of polarization plane as described above, and hence emitted therefrom as the S-polarized light and incident to the third PBS 4.

The B-light component (S-polarized light) is reflected at the polarization-splitting plane 41 of the third PBS 4 and emitted from a light-passing plane 4a, and thus incident to the reflective SLM 63 for light modulation in accordance with a video signal corresponding to the B-light component.

The P-polarized light generated for the B-light component due to light modulation passes through the polarization-splitting plane 41 of the third PBS 4 and incident to the R-phase plate 9. The B-light component (P-polarized light) incident to the G-phase plate 9 is not subjected to rotation of polarization plane as described above, and hence emitted therefrom as the P-polarized light.

The B-light component (P-polarized light) passes through the polarization splitting plane 51 of the fourth PBS 5. The B-light component (P-polarized light) is emitted from the light-passing plane 5c of the fourth PBS 4, and thus incident to the G-phase plate 9.

The B-light component (P-polarized light) incident to the G-phase plate 9 is not subjected to rotation of polarization plane as described above, and hence emitted therefrom as the P-polarized light.

As disclosed above, the white light incident to the CSR optical system 1 via the G-phase plate 6 is separated into the R-, G- and B-light components and recombined as all of the three light components are converted into P-polarized lights at their polarization plane, and emitted from the G-phase plate 7.

When usual optical glass such as BK7 is used for the CSR optical system 1, it will cause low contrast at the corners of a black image screen, which exhibit high intensity at the peripheral sections of the black image due to birefringence occurring on the optical elements.

Birefringence will occur due to thermal stress generated while light beams are passing through the optical elements or external mechanical stress. For example, a big temperature difference between the center of a square column-like optical element and the corners of the square column could cause thermal stress concentrated on the square corners, thus resulting in birefringence at the corners.

When a linearly-polarized light passes through an optical element in which birefringence is occurring, the plane of polarization of the linearly-polarized light is rotated, which then affects images on screen.

This phenomenon is explained in detail with reference to FIG. 4. Illustrated in FIG. 4 is a projector having one PBS 22 and one reflective SLM 24 and a projection lens 25.

The above-discussed phenomenon in which a black image screen suffers low contrast at its corners is the most significant problem due to birefringence affecting images on screen.

A black image is displayed when light incident to the SLM 24 through a specific light path returns to the path inversely with no light modulation. In detail, in FIG. 4, S-polarized light components (solid line) incident to the PBS 22 are reflected at a polarization-splitting plane 23 and incident to the reflective SLM24. The reflected light components are the S-polarized light unchanged with no modulation while displaying a black image. The S-polarized light components reflected at the reflective SLM 24 are further reflected at the polarization-splitting plane 23 again and return to the light path inversely, thus a black image being displayed on screen via the projection lens 25.

Figure 4:
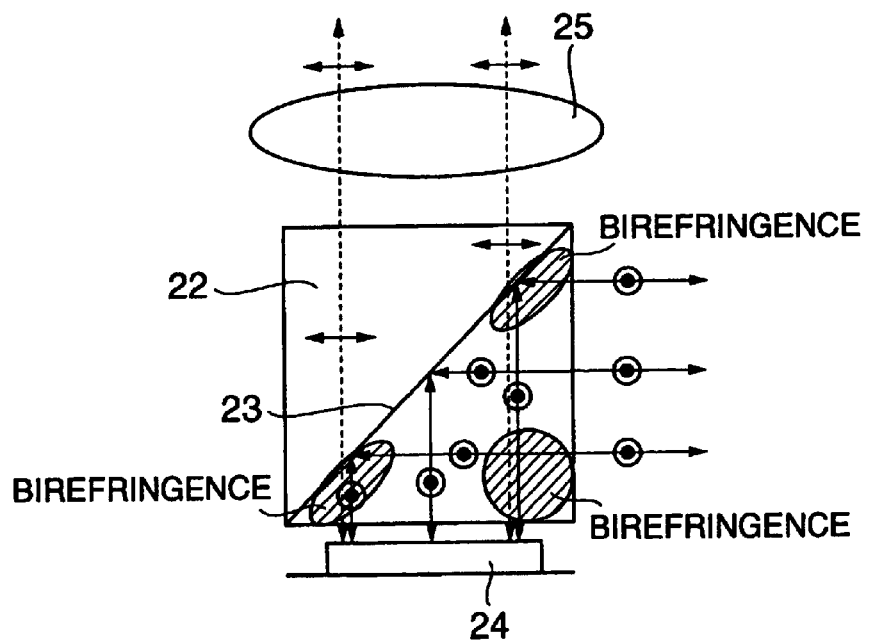
FIG. 4 illustrates effects of birefringence to images on screen.

When birefringence occurs on the transparent material of the PBS 22, as indicated by oblique lines in FIG. 4, S-polarized light components passing therethrough are subjected to rotation of polarization plane, thus generating P-polarized light components, as indicated by dot lines in FIG. 4. The P-polarized light components pass through the polarization splitting plane 23 and generate bright portions at the corners of a black image screen via the projection lens 25. This is the phenomenon discussed so far caused by birefringence.

Figure 5:
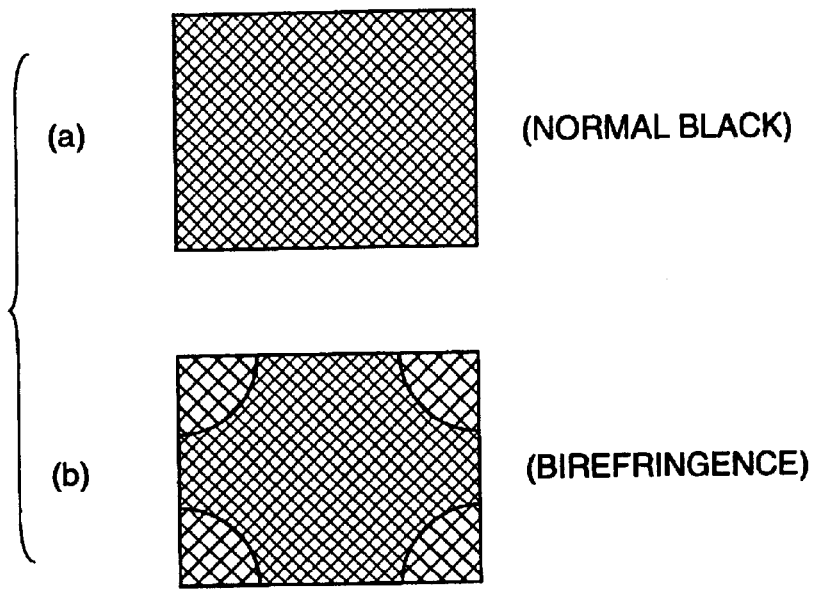
FIG. 5 illustrates black image screens for a normal black image and a birefringence-affected black image.

FIG. 5 illustrates black image screens in which FIG. 5(a) is an illustration of a normal black image whereas FIG. 5(b) bright portions appeared at the corners of a black image due to birefringence.

Figure 6:
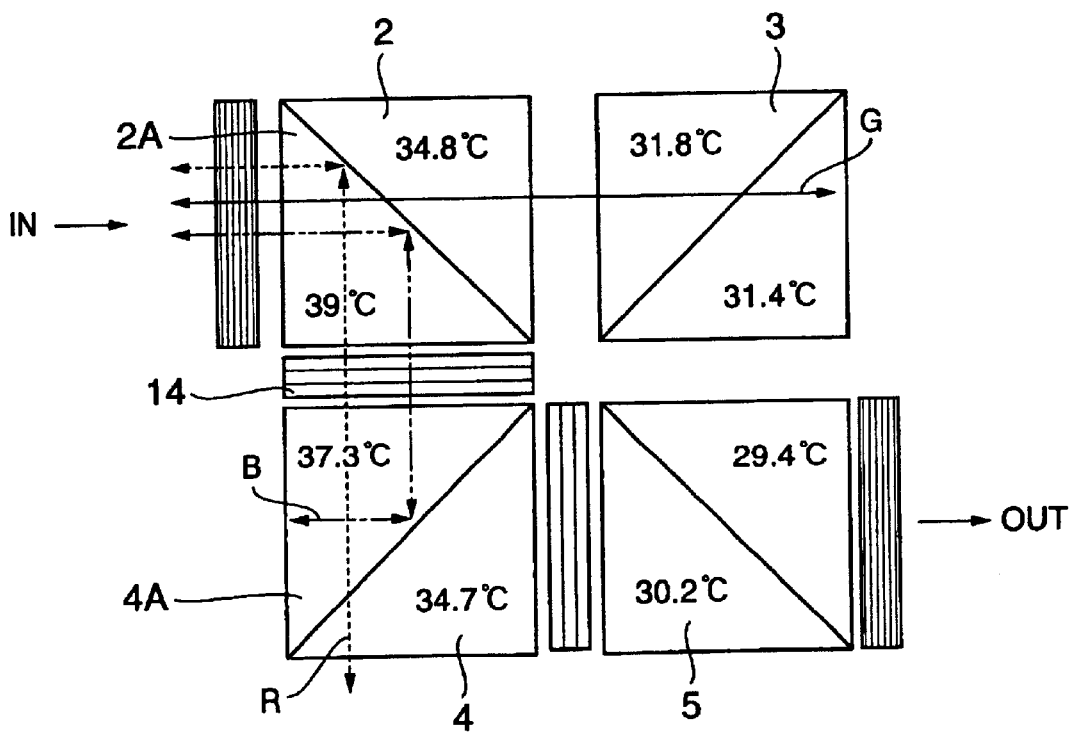
FIG. 6 illustrates a surface temperature measured on each polarization beam splitter (PBS) in the first embodiment.

One of the causes of birefringence is thermal stress as already discussed. The surface temperature on the first to the fourth PBSs 2 to 5 of the CSR optical system 1 (FIG. 3) were measured for thermal stress, as shown in FIG. 6.

The light source used in this temperature measurement was an extra-high pressure mercury lamp. The surface temperature on each PBS was measured when one hour elapsed after the light source had been turned on at room temperature.

The results were as follows:

The surface temperature on the first PBS 2 (light-incident-side PBS) was the highest, particularly, 39° C. the highest on a triangular prism 2A. The second highest was 37.3° C. on a triangular prism 4A of the third PBS 4. The lowest was in the range from 29° C. to 30° C. on the fourth PBS 5. It was found that the higher the intensity for the light source, the larger the temperature difference.

A possible reason for the highest surface temperature on the triangular prism 2A of the first PBS 2 is that all of the R-, G- and B-light components are incident to the prism 2A and emitted therefrom, and incident thereto again after reflected at the other optical elements.

A possible reason for the second highest surface temperature on the triangular prism 4A of the third PBS 4 is that the R- and B-light components are incident to the prism 4A and emitted therefrom, and incident thereto again after reflected at the other optical elements.

Moreover, a possible reason for the lowest surface temperature on the fourth PBS 5 is that substantially no light components are incident thereto.

The measurement revealed that the first PBS 2 suffered the highest surface temperature compared to any of the other PBSs.

Figure 1:
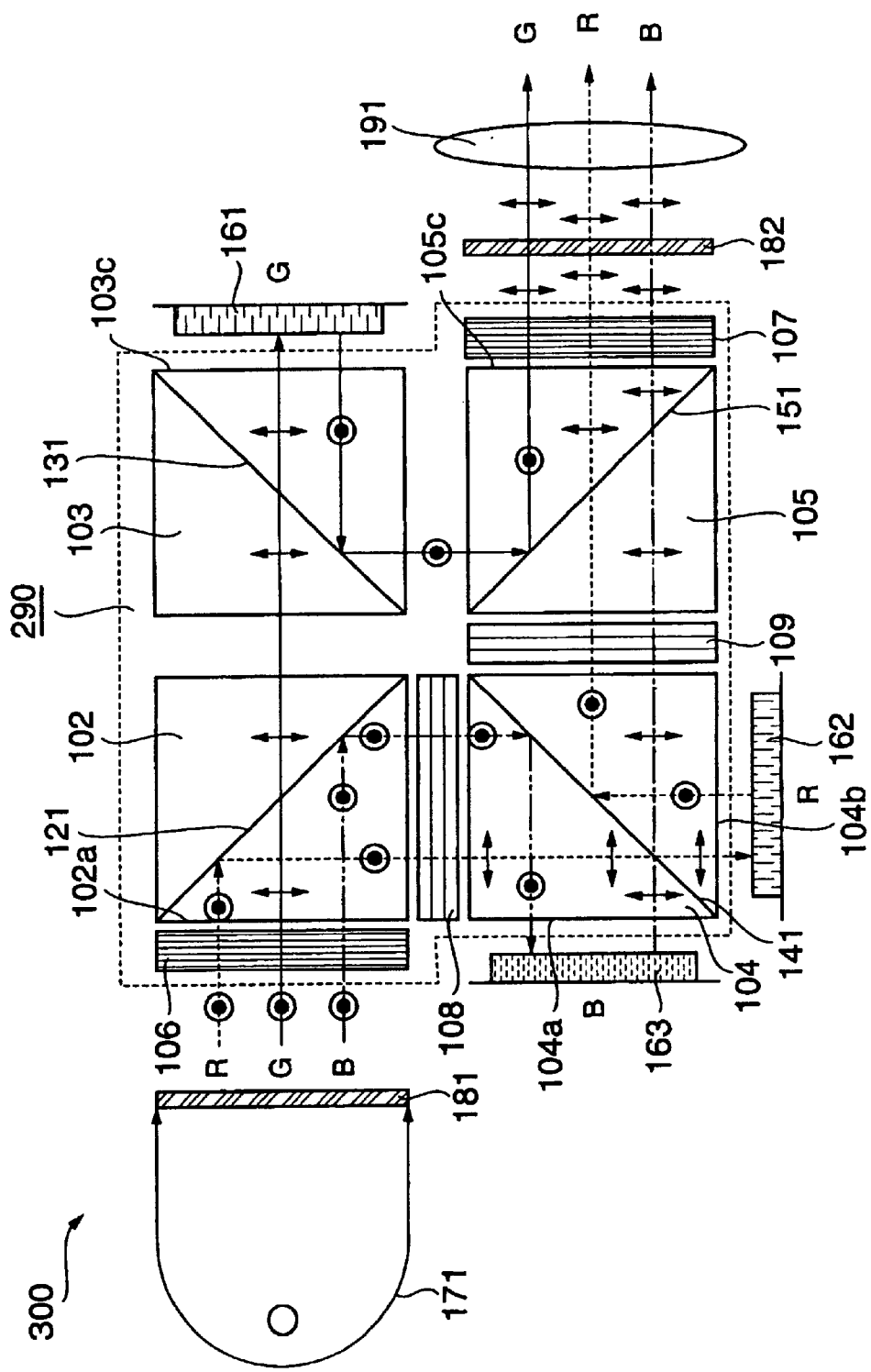
FIG. 1 is a plan view illustrating a known optical architecture for a projection display having reflective spatial light modulators (SLMs)
Figure 2:
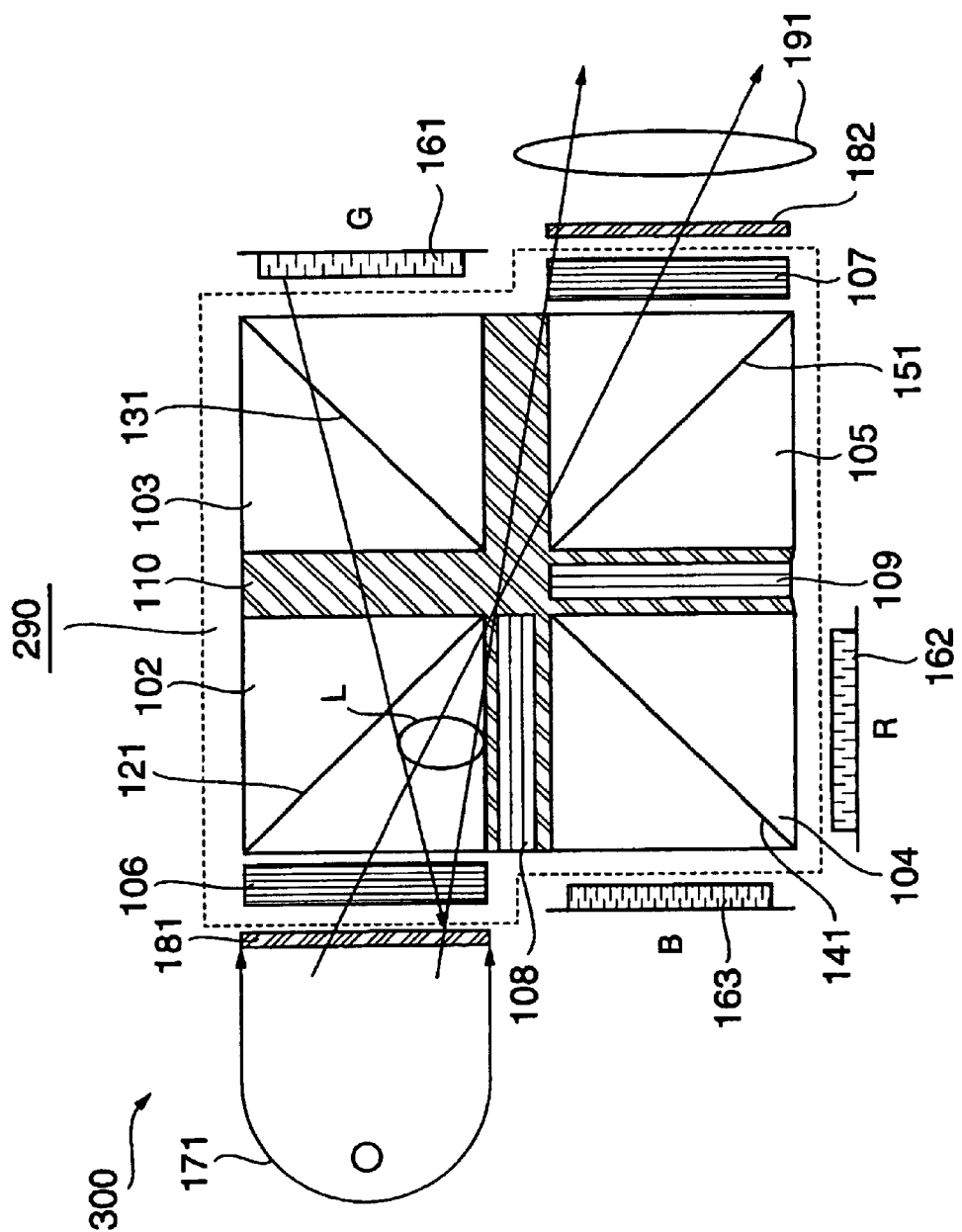
FIG. 2 is another plan view illustrating the known optical architecture for a projection display having reflective SLMs.

The following is a possible explanation for the known CSR optical system 290 (FIG. 1) having all optical elements joined by an adhesive. The surface temperature difference among the optical elements causes difference in thermal expansion among the optical elements, which results in stress and hence birefringence occurred to each optical element, especially, the first PBS 102 that suffers the largest temperature increase while in use.

On the contrary, the CSR optical system 1 (FIG. 3) as the first embodiment of the present invention suffered fur less generation of birefringence. A possible reason lies in the optical arrangements in that the first PBS 2 is separated, via gap, from the optical joint component 11 formed of the G-phase plate 7, the R-phase plates 8 and 9 and the second to fourth PBSs 3 to 5 bonded each other by the joint material 10 such as an adhesive. The arrangements could serve to restrict stress to the first PBS 2, which may otherwise occur due to the temperature difference between the PBS 2 and the other optical elements.

The thermal-cyclic reliability test was also conducted to the CSR optical system 1. The result was no peeling-off for the optical elements at the joint sections. A possible reason is as follows: Stress was generated from the center of the intersection of the four polarization-splitting planes 21, 31, 41 and 51 in the direction of circumference due to thermal expansion and contraction during the thermal-cyclic reliability test. The stress was, however, released at the first PBS 2 separated from the optical joint component 11, resulting in no outward shear and tensile stress which were generated for the known optical system 290.

[Second Embodiment]

Figure 7:
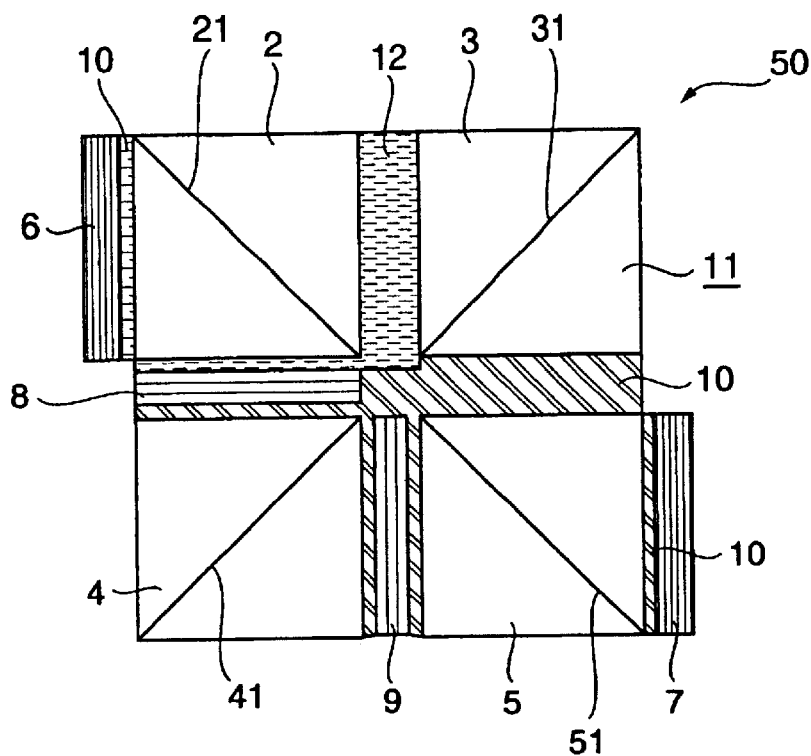
FIG. 7 is a plan view illustrating the second embodiment of a CSR optical system according to the present invention.

FIG. 7 is a plan view illustrating the second embodiment of a CSR optical system according to the present invention.

Elements in this embodiment that are the same as or analogous to the elements in the first embodiment (FIG. 3) are referenced by the same reference numbers and will not be explained in detail.

In a CSR optical system 50, a first PBS (the light-incident-side PBS) 2 and a G-phase plate 6 provided at the light-incident side are attached to an optical joint component 11 (in which second to fourth PBSs 3 to 5, a G-phase plate 7 and R-phase plates 8 and 9 are joined each other) by a buffer material 12 such as a transparent adhesive or coupling oil.

The first PBS 2 and the G-phase plate 6 may be joined by a joint material 10 or the buffer material 12. The third PBS 4 and the R-phase plate 8 may be separated from each other via gap instead of being joined by the joint material 10.

The second embodiment is equivalent to the first embodiment in operation, and hence not disclosed for brevity.

According to the second embodiment, like the first embodiment, the first PBS (light-incident-side PBS) 2 is separated from the optical joint component 11 via the buffer material 12. This optical arrangement serves to restrict thermal stress to the first PBS 2, which may otherwise occur due to temperature difference between the first PBS 2 and the optical joint component 11, even when the PBS2 is heated to a temperature higher than the component 11 while light is passing the PBS 2, thus causing less birefringence.

The thermal-cyclic reliability test also showed that the stress generated by thermal expansion and contraction of each optical element was released at the first PBS 2, resulting no peeling-off for the optical elements from each other at the joint sections.

[Third Embodiment]

Figure 8:
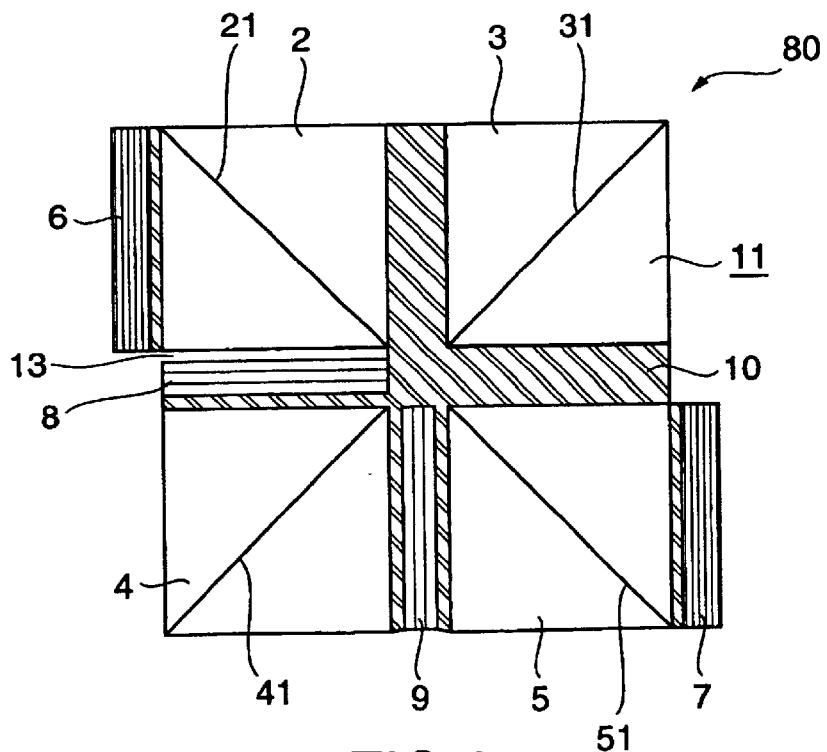
FIG. 8 is a plan view illustrating the third embodiment of a CSR optical system according to the present invention.

FIG. 8 is a plan view illustrating the third embodiment of a CSR optical system according to the present invention.

Elements in this embodiment that are the same as or analogous to the elements in the first embodiment (FIG. 3) are referenced by the same reference numbers and will not be explained in detail.

In a CSR optical system 80, all of first to fourth PBSs 2, 3, 4 and 5, G-phase plates 6 and 7, and also R-phase plates 8 and 9 are joined each other by a joint material 10, with a slit 13 (gap) between the first PBS 2 and the R-phase plate 8. The G-phase plate 6 and the first PBS 2 may be separated from each other or joined by a transparent buffer material. The slit 13 may also be filled with a transparent buffer material.

The third embodiment is equivalent to the first embodiment in operation, and hence not disclosed for brevity.

According to the third embodiment, the slit 13 provided between the first and the third PBSs 2 and 4 which tend to be heated to a high temperature while light is passing serves to release the stress due to difference in thermal expansion for the optical elements, thus resulting in less generation of birefringence.

Moreover, the slit 13 serves to release the stress generated from the center of the intersection of polarization-splitting planes 21, 31, 41 and 51 of the four PBSs in the direction of circumference due to thermal expansion and contraction, resulting in no peeling-off for the optical elements from each other at the joint sections.

[Fourth Embodiment]

Figure 9:
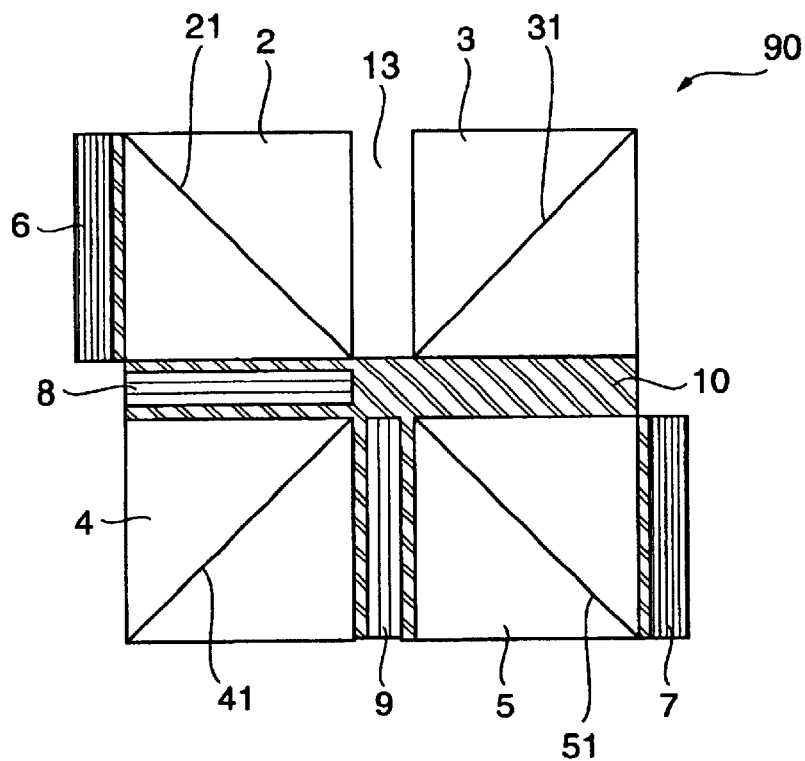
FIG. 9 is a plan view illustrating the fourth embodiment of a CSR optical system according to the present invention.

FIG. 9 is a plan view illustrating the fourth embodiment of a CSR optical system according to the present invention.

Elements in this embodiment that are the same as or analogous to the elements in the first embodiment (FIG. 3) are referenced by the same reference numbers and will not be explained in detail.

A CSR optical system 90 is equivalent to the optical system 80 in FIG. 8 except that a slit (gap) 13 is provided between first and second PBSs 2 and 3, as shown in FIG. 9. The slit 13 may be filled with a transparent buffer material.

The fourth embodiment is equivalent to the first embodiment in operation, and hence not disclosed for brevity.

According to the fourth embodiment, the slit 13 provided between the first PBS 2 which tends to be heated to a high temperature while light is passing and the second PBS 3 (instead of the third PBS 4 in FIG. 8) serves to release the stress due to difference in thermal expansion for the optical elements, thus resulting in less generation of birefringence.

This slit 13 also serves to release the stress generated from the center of the intersection of polarization-splitting planes 21, 31, 41 and 51 of the four PBSs in the direction of circumference due to thermal expansion and contraction, resulting in no peeling-off for the optical elements from each other at the joint sections.

[Discussion on Opto-Elastic Constant of PBS-Transparent material]

It is a known fact that a polarization beam splitter suffers birefringence in accordance with an opto-elastic constant of a transparent material for the beam splitter. It is also known that glasses as an optical material of low opto-elastic constant are expensive.

Under consideration of these facts, CSR optical systems should be designed in accordance with projection and economical efficiency.

Birefringence to CSR optical systems will be discussed through experiments on opto-elastic constant of glasses as an optical material for PBSs.

Figure 10:
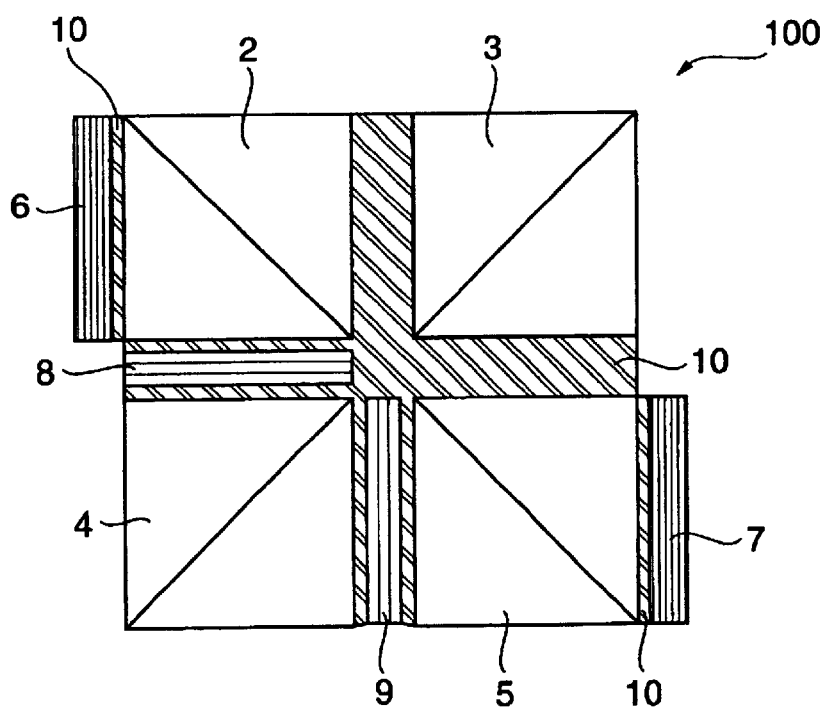
FIG. 10 is a plan view illustrating a sample CSR optical system representative of several samples used in birefringence experiments.

FIG. 10 is a plan view illustrating a sample CSR optical system 100 representative of several samples used in the experiments.

Elements of the CSR optical systems 100 that are the same as or analogous to elements in the first embodiment (FIG. 3) are referenced by the same reference numbers and will not be explained in detail.

Several sample CSR optical system 100 were made by joining all optical elements (first to fourth PBSs 2 to 5, G-phase plates 6 and 7, and R-phase plates 8 and 9) with a joint material 10 such as a transparent adhesive.

Experimental results are shown in FIG. 11. Birefringence was evaluated on 15 sample CSR optical systems 100 made of several glass types different in opto-elastic constant for the first to fourth PBSs 2 to 5.

FIG. 12 indicates the evaluation criteria as follows:

X useless due to much birefringence

Δ useful only for low-quality projection display

○ birefringence noticed by close observation

⊚ no birefringence observed

FIG. 12 also illustrates four birefringence-evaluation models, though birefringence will be observed in more different ways, which depend on evaluation conditions.

The experiments were conducted using a relatively low intensity 100 W-UHP lamp, a intermediate-intensity 150 W-UHP lamp (Philips Co.-made extra-pressure mercury lamps) and also a high intensity 200 W-UHL lamp (Ushio Co.-made extra-pressure mercury lamp).

Discussed first is birefringence against the 100 W-light source.

The sample 1 was made of BK7 (SCHOTT made) having opto-elastic constant of $2.77 \times 10^{-8}$ cm$^2$/N for the first to the fourth PBSs 2 to 5. It was found that this sample can be used for low-quality projection displays even though birefringence was observed (Δ).

The sample 2 was made of SF1 (SCHOTT made) having opto-elastic constant of $1.8 \times 10^{-8}$ cm$^2$/N only for the first PBS (light-incident-side PBS) 2 and BK7 having opto-elastic constant of $2.77 \times 10^{-8}$ cm$^2$/N for the other PBSs. Birefringence was observed at the corners by close observation (○).

The sample 3 was made as having opto-elastic constant for the first PBS 2 smaller than the sample 2. In detail, SF4 (SCHOTT made) having opto-elastic constant of $1.36 \times 10^{-8}$ cm$^2$/N was used for the first PBS 2 in the sample 3. The other PBSs of the sample 3 were the same as those of the sample 2. No birefringence was observed (⊚).

Discussed next is birefringence against the 150 W-light source.

The sample 4 was made of BK7 having opto-elastic constant of $2.77 \times 10^{-8}$ cm$^2$/N for the first to the fourth PBSs 2 to 5, like the sample 1. It was found that this sample is useless because much birefringence was observed (X).

The sample 5 was made of SF1 having opto-elastic constant of $1.8 \times 10^{-8}$ cm$^2$/N for the first to the third PBS 2 and BK7 having opto-elastic constant of $2.77 \times 10^{-8}$ cm$^2$/N for the fourth PBS (light-emitting-side PBS) 5. It was found that this sample can be used for low-quality projection displays even though birefringence was observed (Δ).

The sample 6 was made as having opto-elastic constant for the first to the third PBSs 2 to 4 smaller than the sample 5. In detail, SF4 having opto-elastic constant of $1.36 \times 10^{-8}$ cm$^2$/N was used for these PBSs. The fourth PBS (light-emitting-side PBS) 5 of the sample 6 was the same as the sample 5. Birefringence was observed at the corners by close observation (○).

The sample 7 was made of SF4 having opto-elastic constant of $1.36 \times 10^{-8}$ cm$^2$/N for the first PBS (light-incident-side PBS) 2, SF1 having opto-elastic constant of $1.8 \times 10^{-8}$ cm$^2$/N for the second and the third PBSs (main PBSs) 3 and 4, and BK7 having opto-elastic constant of $2.77 \times 10^{-8}$ cm$^2$/N for the fourth PBS (light-emitting-side PBS) 5. Birefringence was observed at the corners by close observation (○).

The sample 8 was made of PBH (Ohara made) having further small opto-elastic constant of $0.65 \times 10^{-8}$ cm$^2$/N only for the first PBS (light-incident-side PBS) 2 and SF2 having opto-elastic constant of $2.62 \times 10^{-8}$ cm$^2$/N for the other PBSs. Birefringence was observed at the corners by close observation (○).

The sample 9 was made of PBH6 having opto-elastic constant of $0.65 \times 10^{-8}$ cm$^2$/N for the first PBS (light-incident-side PBS) 2, SF1 having opto-elastic constant of $1.8 \times 10^{-8}$ cm$^2$/N for the second and the third PBSs (main PBSS) 3 and 4, and SF2 having opto-elastic constant of $2.62 \times 10^{-8}$ cm$^2$/N for the fourth PBS (light-emitting-side PBS) 5. No birefringence was observed (⊚).

Discussed further is birefringence against the 200 W-light source.

The sample 10 was made of SF1 having opto-elastic constant of $1.8 \times 10^{-8}$ cm$^2$/N for the first to the fourth PBSs 2 to 5. It was found that this sample is useless because much birefringence was observed (X).

The sample was made of PBH6W having opto-elastic constant of $0.65 \times 10^{-8}$ cm$^2$/N only for the first PBS (light-incident-side PBS) 2 and SF2 having opto-elastic constant of $2.62 \times 10^{-8}$ cm$^2$/N for the other PBSs. It was found that this sample can be used for low-quality projection displays even though birefringence was observed (Δ).

The sample 12 was made of PBH6 having opto-elastic constant of $0.65 \times 10^{-8}$ cm$^2$/N for the first PBS (light-incident-side PBS) 2, SF1 having opto-elastic constant of $1.8 \times 10^{-8}$ cm$^2$/N for the second and the third PBSs (main PBSs) 3 and 4, and SF2 having opto-elastic constant of $2.62 \times 10^{-8}$ cm$^2$/N for the fourth PBS (light-emitting-side PBS) 5. Birefringence was observed on the corners by close observation (○).

The sample 13 was made of PBH6 having opto-elastic constant of $0.65 \times 10^{-8}$ cm$^2$/N for the first to the third PBSs 2 to 4 and SF2 having opto-elastic constant of $2.62 \times 10^{-8}$ cm$^2$/N for the fourth PBS (light-emitting-side PBS) 5. No birefringence observed was observed (⊚).

The sample 14 was made of PBH5 (Ohara made) having the smallest opto-elastic constant of $0.03 \times 10^{-8}$ cm$^2$/N only for the first PBS (light-incident side PBS) 2 and PBH6W having optoelastic constant of $0.65 \times 10^{-8}$ cm$^2$/N for the other PBSs. No birefringence observed was observed (⊚).

The sample 15 was made of PBH55 having opto-elastic constant of $0.03 \times 10^{-8}$ cm$^2$/N for the first to the third PBSS 2 to 4 and SF2 having opto-elastic constant of $2.62 \times 10^{-8}$ cm$^2$/N for the fourth PBS (light-emitting-side PBS) 5. No birefringence observed was observed (⊚).

Generation of birefringence varied in accordance with the opto-elastic constant of glasses used for the PBS optical materials. Nonetheless, the followings were found according to the overall evaluation of the experiments.

Firstly, it is required that glass types be selected for each PBS to meet the requirement Ki<Km and Ko in which Ki, Km and Ko denote the opto-elastic constants for the first PBS (light-incident-side PBS) 2, the second and the third PBSs (main PBSs) 3 and 4, and the fourth PBS (light-emitting-side PBS) 5, respectively. Substantially no birefringence will be observed with the first PBS 2 made of glass that meets the requirement $Ki<1\times10^{-8}$ cm$^2$/N against a 200 W-class high-intensity light source.

It is more required that glass types be selected for each PBS to meet the requirement Ki<Km<Ko. Substantially no birefringence will be observed with the first to the third PBSs 2 to 4 made of glass that meets the requirement $Ki<1\times10^{-8}$ cm$^2$/N and $Km<2\times10^{-8}$ cm$^2$/N against a 200 W-class high-intensity light source.

It is furthermore required that glass types be selected for each PBS to meet the requirement Ki and Km<Ko. Substantially no birefringence will be observed with the first to the third PBSs 2 to 4 made of glass that meets the requirement Xi and $Km<1\times10^{-8}$ cm$^2$/N against a 200 W-class high-intensity light source.

The experimental results for opto-elastic constant of PBS optical materials can be applied to the first to the fourth embodiments of CSR optical systems.

Moreover, the experimental results can be applied to a CSR optical system in which all of the first to the fourth PBSs separated from each other, for effective restriction of birefringence.

[Fifth Embodiment]

Figure 13:
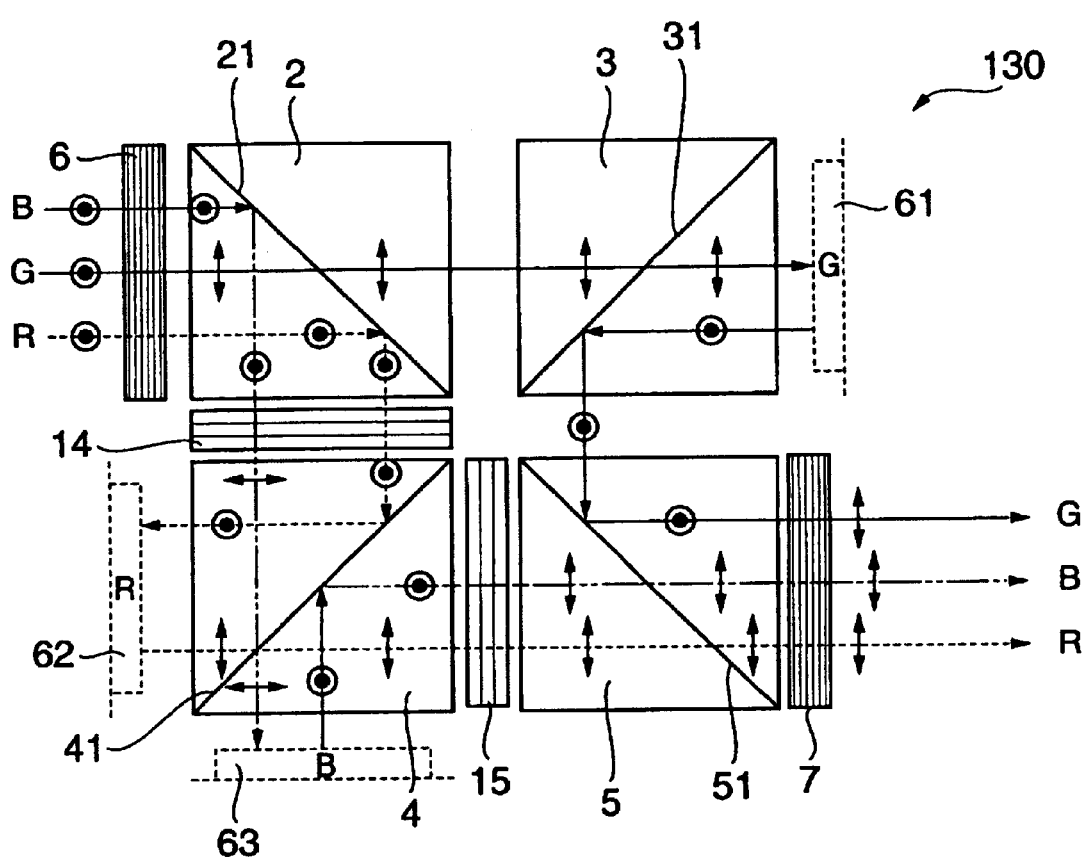
FIG. 13 is a plan view illustrating the fifth embodiment of a CSR optical system according to the present invention.

FIG. 13 is a plan view illustrating the fifth embodiment of a CSR optical system according to the present invention.

Elements in this embodiment that are the same as or analogous to the elements in the first embodiment (FIG. 3) are referenced by the same reference numbers and will not be explained in detail.

A CSR optical system 130 shown in FIG. 13 is different from the counterpart of the first embodiment in that third wavelength-selective polarization converters 14 and 15 are B-phase plates for rotating the plane of polarization of B-light component by 90 degrees. Under the conditions, the reflective SLMs 62 and 63 in the first embodiment (FIG. 3) are replaced with each other in the fifth embodiment, as shown in FIG. 13.

R-light component (dot line in FIG. 13) will not be affected by the third wavelength-selective polarization converters 14 and 15 because they are B-phase plates. The S-polarized light of the incident R-light component is then reflected at both polarization-splitting planes 21 and 41 of first and third PBSs 2 and 4, respectively. The reflected S-polarized light is incident to a reflective SLM 62 for R-light component and converted into P-polarized light. The converted P-polarized light passes through both polarization-splitting planes 41 and 51 of third and fourth PBSs 4 and 5, respectively, and is emitted from a G-phase plate 7.

On the contrary, the S-polarized light of the B-light component (two-dashed line) is reflected at the polarization-splitting plane 21 of the first PBS 2. The reflected S-polarized light is converted into a P-polarized light by the third wavelength-selective polarization converter 14 (called B-phase plate hereinafter). The P-polarized light passes through the polarization-splitting plane 41 of the third PBS 4 and is incident to a reflective SLM 63 for B-light component.

The S-polarized light of the B-light component modulated by the SLM 63 is reflected at the polarization-splitting plane 41 of the third PBS 4 and converted into P-polarized light by the B-phase plate 15. The P-polarized light of the B-light component passes through the polarization-splitting plane 51 of the fourth PBS and is emitted from the G-phase plate 7.

The G-light component behaves like the counterpart in the first embodiment (FIG. 3), and hence is not disclosed for brevity.

The incident three light components for R-, G- and B-color primary colors are all converted into P-polarized lights at their polarization plane, and emitted from the CSR optical system 130.

Also in the fifth embodiment, when white light is incident to the CSR optical system 130 via the G-phase plate 6, it is separated into the R-, G- and B-light components. The separated light components are incident to the corresponding reflective SLMs 61, 62 and 63 for modulation with a video signal. The modulated light components are recombined and emitted from the G-phase plate 7.

Moreover, all structural modifications to the foregoing embodiments and also opt-elastic constant requirements discussed above can be applied to the fifth embodiment, for effective restriction of birefringence.

All embodiments disclosed above have the G-phase plates 6 and 7 at the light-incident side of the first PBS 2 and the light-emitting side of the fourth PBS 5, respectively. However, the other wave-selective polarization converters can be placed there instead of the G-phase plates 6 and 7, with one requirement that each wave-selective polarization converter to be placed between two PBSs be selected in accordance with the positional relativity with the PBSs.

[Six Embodiment]

Figure 14:
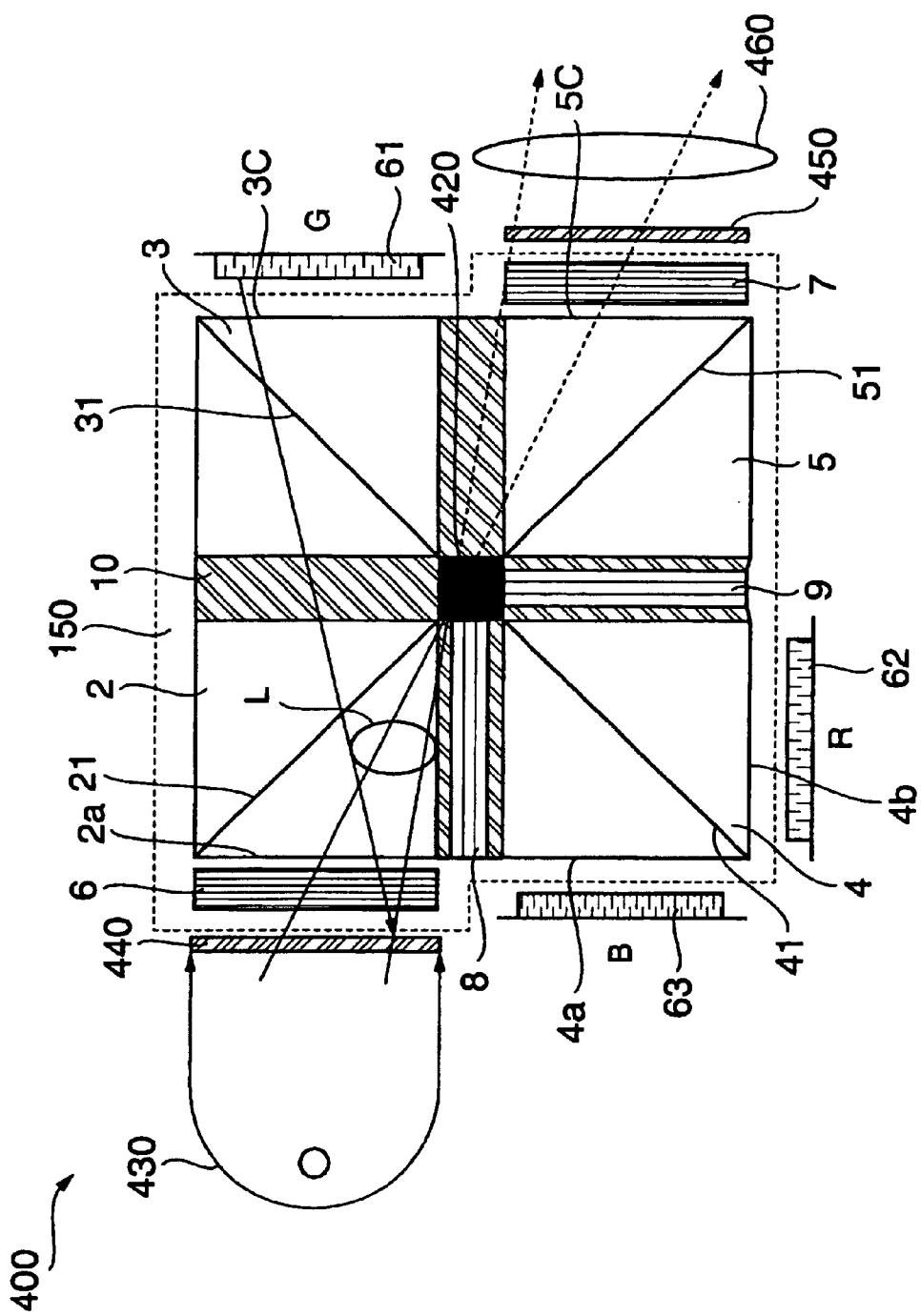
FIG. 14 is a plan view illustrating a projection display as the sixth embodiment of the present invention.

FIG. 14 is a plan view illustrating a projection display as the sixth embodiment of the present invention.

A projection display 400 is equipped with a CSR optical system 150, a light source 430 and a first polarizing plate 440 both provided at the light-incident side of the CSR optical system 150, and a second polarizing plate 450 and a projection lens 460 both provided at the light-emitting side of the CSR optical system 150. The projection display 400 is further equipped with reflective SLMs 61, 62 and 63 placed on light-passing planes 3c, 4a and 4b of second and third PBSs 3 and 4, respectively.

The optical elements of the CSR optical system 150 that are the same as or analogous to the elements in the first embodiment (FIG. 3) are referenced by the same reference numbers and will not be explained in detail.

The difference between the CSR optical system 150 and the counterpart in the first embodiment is that the former has a light blockage 420 at the center of the CSR optical system 150 surrounded by the first to fourth PBSs 2, 3, 4 and 5. The light blockage 420 is made of a heat-resistant resin capable of light blocking such as polyimide, polyethylene, acrylic and rubber.

In operation, white light as un-polarized light emitted from the light source 430 is incident to the first polarizing plate 440. A specific linearly-polarized light component of the white light only is allowed to pass the polarizing plate 440. The linearly-polarized light component is then incident to the CSR optical system 150 via a first wavelength-selective polarization converter 6 (G-phase plate).

The linearly-polarized light component is separated into R-, G- and B-light components and recombined as all of the three light components are converted into another specific linearly-polarized light component by the CSR optical system 150, like disclosed in the first embodiment.

The other specific linearly-polarized light component only is allowed to pass the second polarizing plate 450 and projected onto a screen (not shown) via the projection lens 460.

During this operation, unnecessary light components L (solid line in FIG. 14) leaked from the first PBS 2 (lightincident-side PBS) are blocked by the light blockage 420 at the intersection of polarization-splitting planes 21, 31, 41 and 51 and surrounded by the first to fourth PBSs 2, 3, 4 and 5.

The unnecessary light components L will thus not be projected onto the screen from the fourth PBS 5 (light-emitting-side PBS) via the projection lens 460, which may otherwise occur as indicated by a dot line in FIG. 14.

As disclosed, the light blockage 420 serves to prevent generation of bright portions on screen due to projection of unnecessary light components, thus enhancing image quality, which may otherwise be lowered as discussed for the known projection display.

[Seventh Embodiment]

Figure 15:
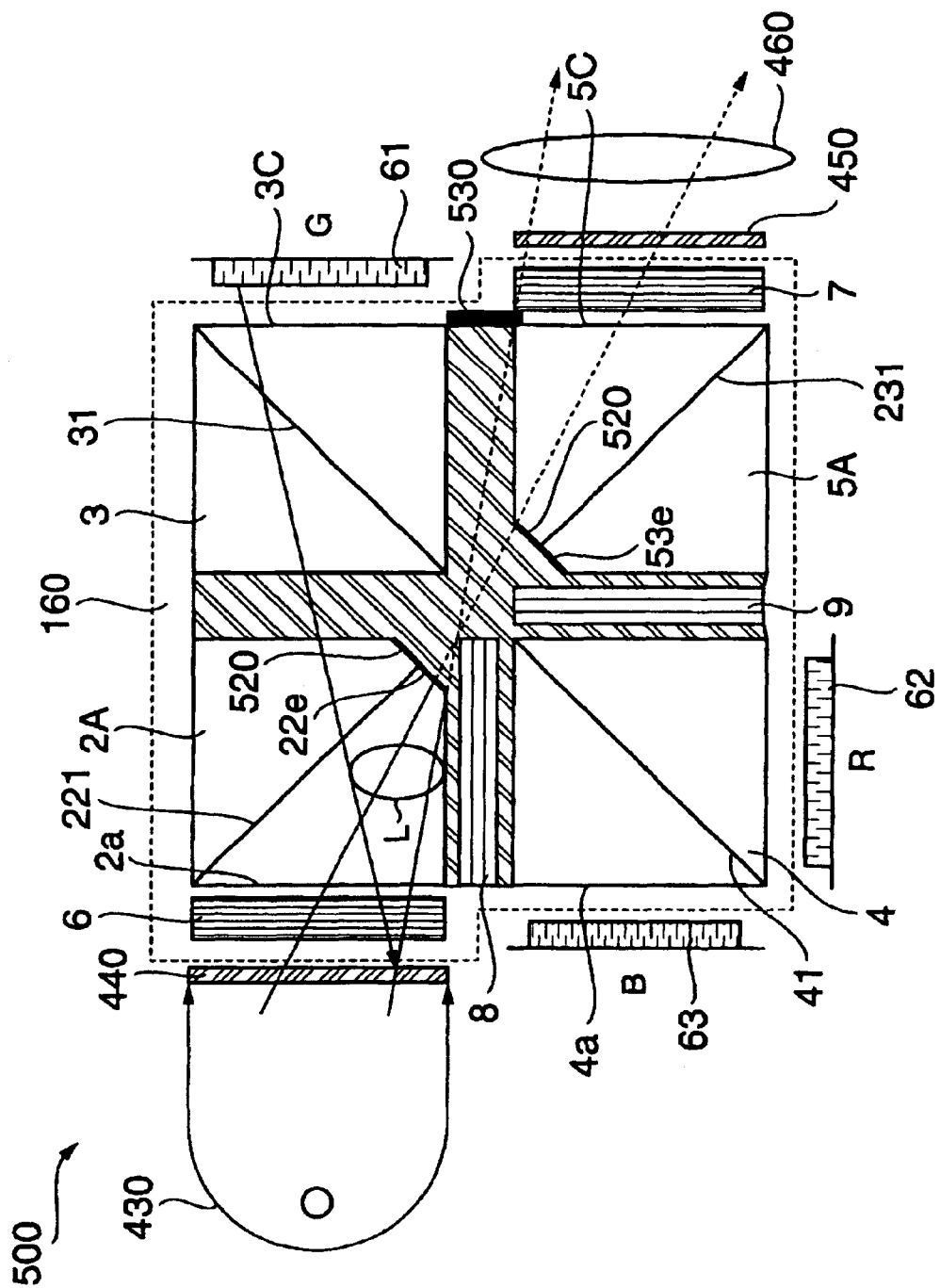
FIG. 15 is a plan view illustrating a projection display as the seventh embodiment of the present invention.

FIG. 15 is a plan view illustrating a projection display as the seventh embodiment of the present invention.

The elements in this that are the same as or analogous to the elements in the first and the sixth embodiments (FIGS. 3 and 14) are referenced by the same reference numbers and will not be explained in detail.

The difference between a projection display 500 in the seventh embodiment and the counterpart in the sixth embodiment is that the former has first light blockages 520 at corners 22e and 53e of first and fourth PBSs 2A and 5A, respectively, for which corner edges have been cut off to be flat.

Another difference is that the projection display 500 further has a second light blockage 530 provided on a light-passing plane 5c of the fourth PBS 5A but close to the second PBS 3. The second light blockage 530 is also used for blocking unnecessary light components. However, the first light blockages 520 only are essential for this purpose in practical use.

Like the sixth embodiment, unnecessary light components L (solid line in FIG. 15) leaked from the first PBS 2A (light-incident-side PBS) are blocked by the light blockages 520 and 530. The unnecessary light components L will thus not be projected onto a screen (not shown) from a fourth PBS 5A (light-emitting-side PBS) via a projection lens 460, which may otherwise occur as indicated by a dot line in FIG. 15.

As disclosed, also in the seventh embodiment, the light blockages 520 and 530 serve to prevent generation of bright portions on screen due to projection of unnecessary light components, thus enhancing image quality, which may otherwise be lowered as discussed for the known projection display.

[Eighth Embodiment]

Figure 16:
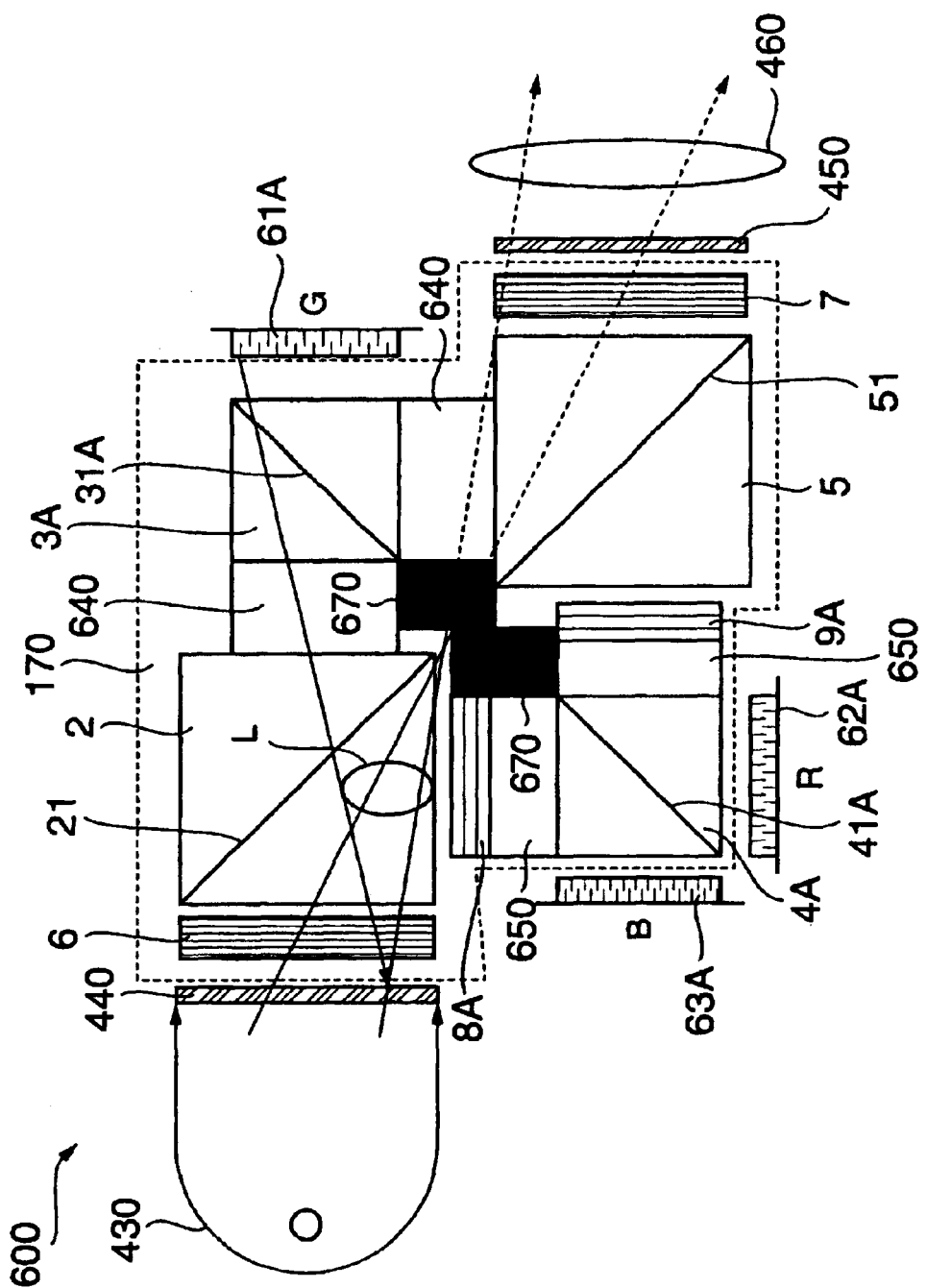
FIG. 16 is a plan view illustrating a projection display as the eighth embodiment of the present invention.

FIG. 16 is a plan view illustrating a projection display as the eighth embodiment of the present invention.

The elements in this embodiment that are the same as or analogous to the elements in the sixth embodiment (FIG. 14) are referenced by the same reference numbers and will not be explained in detail.

The difference between a projection display 600 in the eighth embodiment and the counterpart in the sixth embodiment is that the former is equipped with a CSR optical system 170 having second and third PBSs 3A and 4A smaller than first and fourth PBSs 2 and 5, in accordance with the size of reflective SLMs 61A, 62A and 63A.

One of the features of the projection display 600 lies in short optical length. In detail, an optical length from a light source 430 to each of the reflective SLMs 61A, 62A and 63A is almost equal to that from each SLM to a projection lens 460.

Another feature of the projection display 600 lies in two pairs of optical couplers 640 and 650 (made of transparent glass, for example) for the shortened optical length and protection of surface reflection on the first to the fourth PBSs 2, 3A, 4A and 5. The optical couplers 640 are placed in gaps between the first and the second PBSs 2 and 3A and also the second and the fourth PBSs 3A and 5. The optical couplers 650 are placed in gaps between the first and the third PBSs 2 and 4A and also the third and the fourth PBS 4A and 5.

Wavelength-selective polarization converters 8A and 9A also placed in the gaps between the first and the third PBSs 2 and 4A and the third and the fourth PBSs 4A and 5, respectively, are made small in accordance with the size of the third PBS 4A, though not limited to this size.

Like the sixth embodiment, light blockages 670 are provided at the intersection of polarization-splitting planes 21, 31A, 41A and 51 and surrounded by the first to fourth PBSS 2, 3A, 4A and 5. The light blockages 670 are made of a heat-resistant resin capable of light blocking such as polyimide, polyethylene, acrylic and rubber. The light blockages 670 can be reformed in shape other than that shown in FIG. 16.

Like the sixth embodiment, unnecessary light components L (solid line in FIG. 16) leaked from the first PBS 2 (light-incident-side PBS) are blocked by the light blockages 670. The unnecessary light components L will thus not be projected onto a screen (not shown) from the fourth PBS 5 (light-emitting-side PBS) via a projection lens 460, which may otherwise occur as indicated by a dot line in FIG. 16.

As disclosed, also in the eighth embodiment, the light blockages 670 serve to prevent generation of bright portions on screen due to projection of unnecessary light components, thus enhancing image quality, which may otherwise be lowered as discussed for the known projection display.

Moreover, in the eighth embodiment, the second and the third PBSs 3A and 4A are made smaller than the first and the fourth PBSs 2 and 5, in accordance with the size of the reflective SLMs 61A, 62A and 63A, thus reducing costs of the projection display 600 including the CSR optical system 170.

[Ninth Embodiment]

Figure 17:
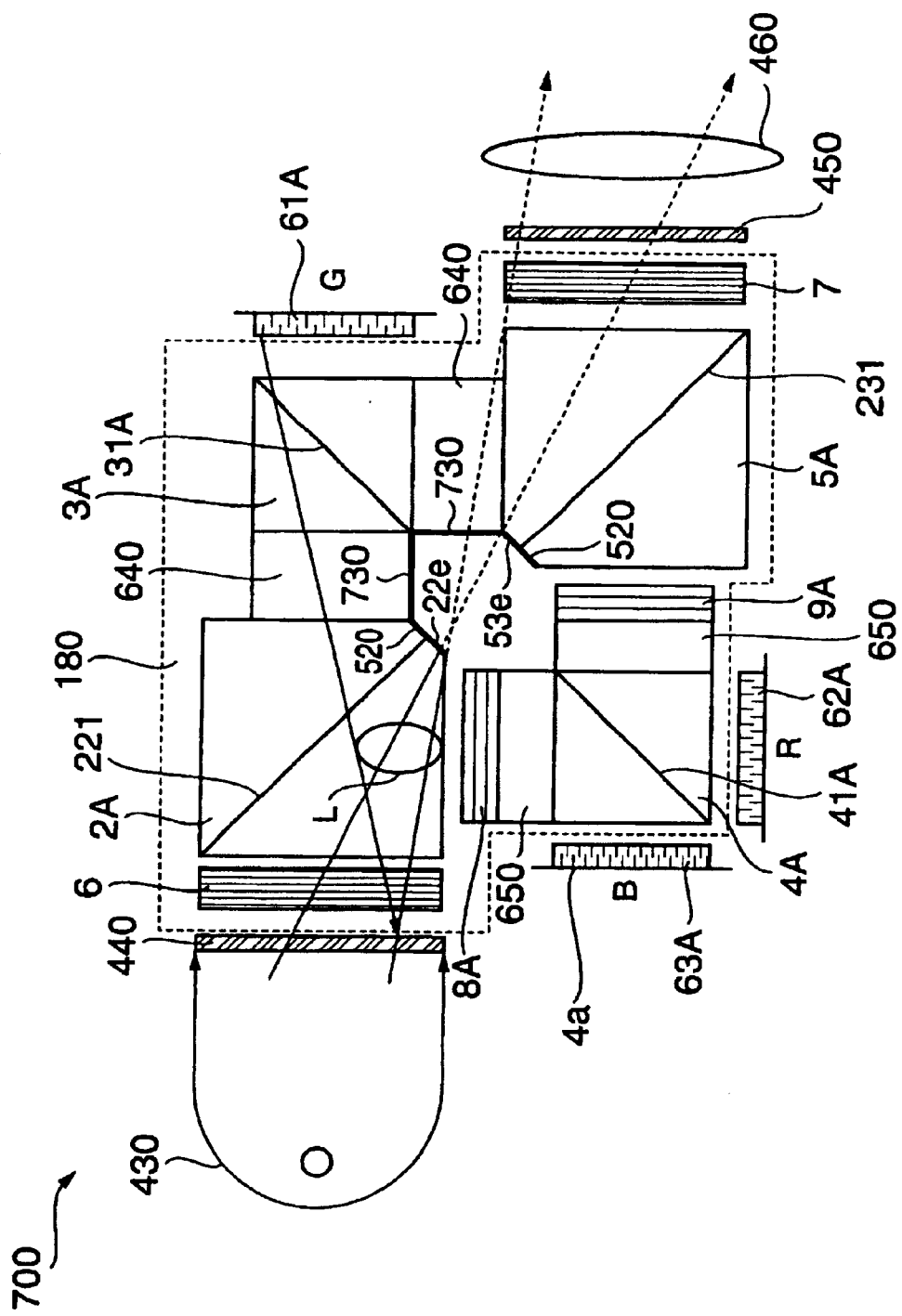
FIG. 17 is a plan view illustrating a projection display as the ninth embodiment of the present invention.

FIG. 17 is a plan view illustrating a projection display as the ninth embodiment of the present invention.

The elements in this embodiment that are the same as or analogous to the elements in the sixth to the eighth embodiments (FIGS. 14, 15 and 16) are referenced by the same reference numbers and will not be explained in detail.

A projection display 700 in the ninth embodiment is equipped with a CSR optical system 180 having second and third PBSs 3A and 4A smaller than first and fourth PBSS 2A and 5A, in accordance with the size of reflective SLMs 61A, 62A and 63A, like the eighth embodiment.

Also like the eighth embodiment, an optical length from a light source 430 to each of the reflective SLMs 61A, 62A and 63A is almost equal to that from each SLM to a projection lens 460.

Moreover, like the eighth embodiment, two pairs of optical couplers 640 and 650 (made of transparent glass, for example) are provided for the shortened optical length and protection of surface reflection on the first to the fourth PBSs 2A, 3A, 4A and 5A. The optical couplers 640 are placed in gaps between the first and the second PBSs 2A and 3A and also the second and the fourth PBSs 3A and 5A. The optical couplers 650 are placed in gaps between the first and the third PBSs 2A and 4A and also the third and the fourth PBS 4A and 5A.

Wavelength-selective polarization converters 8A and 9A also placed in the gaps between the first and the third PBSs 2A and 4A and the third and the fourth PBSs 4A and 5A, respectively, are made small in accordance with the size of the third PBS 4A, though not limited to this size, like the eighth embodiment.

Like the seventh embodiment, the projection display 700 has first light blockages 520 at corners 22e and 53e of the first and the fourth PBSs 2A and 5A, respectively, for which corner edges have been cut off to be flat.

The projection display 700 further has a second light blockages 730 provided on the inner side faces of the optical couplers 640. The second light blockages 730 are also used for blocking unnecessary light components, though not essential. They may be provided only if the first light blockages 520 are not enough for this purpose.

Another plate- or block-like light blockage may be provided at the intersection of polarization-splitting planes 221, 31A, 41A and 231 and surrounded by the first to fourth PBSs 2A, 3A, 4A and 5A.

During operation, unnecessary light components L (solid line in FIG. 17) leaked from the first PBS 2A (light-incident-side PBS) are blocked by the first and the second light blockages 520 and 730.

The unnecessary light components L will thus not be projected onto a screen (not shown) from the fourth PBS 5A (light-emitting-side PBS) via a projection lens 460, which may otherwise occur as indicated by a dot line in FIG. 17.

As disclosed, the light blockages 520 and 730 serve to prevent generation of bright portions on screen due to projection of unnecessary light components, thus enhancing image quality, which may otherwise be lowered as discussed for the known projection display.

Moreover, in the ninth embodiment, the second and the third PBSs 3A and 4A are made smaller than the first and the fourth PBSs 2A and 5A, in accordance with the size of reflective SLMs 61A, 62A and 63A, thus reducing costs of the projection display 700 including the CSR optical system 180.

As disclosed above, a color-separating and -recombining optical system according to the present invention has an optical arrangement in that at least the first polarization beam splitter located at the light-incident side, is separated from other optical elements, at least at its one of inner-side light-passing planes. Thermal stress applied to the first polarization beam splitter that tends to be heated due to three-primary color components passing therethrough is released from the separated sections.

The present invention thus achieves effective restriction of birefringence. The present invention also provides a highly reliable color-separating and -recombining optical system that is hardly peeled off at joint sections of optical elements. This is because of release of thermal stress due to temperature change in various circumstances from the first polarization beam splitter.

Moreover, at least the first polarization beam splitter is made of glass having a small opto-elastic constant. The present invention thus achieves further effective restriction of birefringence.

Furthermore, the present invention provides a color-separating and -recombining optical system having a light blockage at the character-"X"-like intersection of polarization-splitting planes surrounded by the first to fourth polarization beam splitters.

The light blockage serves to prevent unnecessary light components generated in the first polarization beam splitter located at the light-incident side from being projected onto a screen.

The present invention thus achieves high image quality with the color-separating and -recombining optical system having the light blockage used for projection displays.

What is claimed is:

1. A color-separating and -recombining optical system comprising:
    cubic- or square column-like first to fourth polarization beam splitters having polarization-splitting planes intersecting each other like a character-"X"; and
    wavelength-selective polarizing converters each for rotating the plane of polarization of a specific-color light component by 90 degrees, one of the converters being placed at a light-incident side of the first splitter, another of the converters being placed at a light-emitting side of the fourth splitter, the first and the fourth splitters being provided at a light-incident side and a light-emitting side, respectively, of the optical system, the first and the fourth splitters being arranged as diagonally opposing each other, and the remaining converters being placed between at least two inner facing planes of the first to the fourth splitters,
    wherein at least the remaining converters and three of the first to the fourth splitters are joined to form an optical joint component with a gap located between the remaining one splitter and the optical joint component.

2. The color-separating and -recombining optical system according to claim 1, wherein opto-elastic constants for the first to the fourth polarization beam splitters have a relationship $Ki<Km$ and $Ko$ in which $Ki$, $Km$ and $Ko$ denote the opto-elastic constants for the first splitter, the second and the third splitters and the fourth splitter, respectively.

3. The color-separating and -recombining optical system according to claim 1, wherein opto-elastic constants for the first to the fourth polarization beam splitters have a relationship $Ki$ and $Km<Ko$ in which $Ki$, $Km$ and $Ko$ denote the opto-elastic constants for the first splitter, the second and the third splitters and the fourth splitter, respectively.

4. The color-separating and -recombining optical system according to claim 1, wherein opto-elastic constants for the first to the fourth polarization beam splitters have a relationship $Ki<Km<Ko$ in which $Ki$, $Km$ and $Ko$ denote the opto-elastic constants for the first splitter, the second and the third splitters and the fourth splitter, respectively.

5. A color-separating and -recombining optical system comprising:
    cubic- or square column-like first to fourth polarization beam splitters having polarization-splitting planes intersecting each other like a character-"X"; and
    wavelength-selective polarizing converters each for rotating the plane of polarization of a specific-color light component by 90 degrees, one of the converters being placed at a light-incident side of the first splitter, another of the converters being placed at a light-emitting side of the fourth splitter, the first and the fourth splitters being provided at a light-incident side and a light-emitting side, respectively, of the optical system, the first and the fourth splitters being arranged as diagonally opposing each other, and the remaining converters being placed between at least two inner facing planes of the first to the fourth splitters,
    wherein opto-elastic constants for the first to the fourth splitters have a relationship $Ki<Km$ and $Ko$, $Ki$ and $Km<Ko$ or $Ki<Km<Ko$ in which $Ki$, $Km$ and $Ko$ denote the opto-elastic constants for the first splitter, the second and the third splitters and the fourth splitter, respectively.

6. A projection display comprising:
    a light source for emitting unlinearly-polarized light;
    a first polarizer to allow only a first specific-linearly-polarized light component of the unlinearly-polarized light to pass therethrough;

a color-separating and -recombining optical system including cubic- or square column-like first to fourth polarization beam splitters having polarization-splitting planes intersecting each other like a character-"X", the first splitter being provided as facing the first polarizer, and wavelength-selective polarizing converters each for rotating the plane of polarization of a specific-color light component by 90 degrees, one of the converters being placed at a light-incident side of the first splitter, another of the converters being placed at a light-emitting side of the fourth splitter, the first and the fourth splitters being provided at a light-incident side and a light-emitting side, respectively, of the optical system, the first and the fourth splitters being arranged as diagonally opposing each other, and the remaining converters being placed between at least two inner facing planes of the first to the fourth splitters, wherein at least the remaining converters and three of the first to the fourth splitters are joined to form an optical joint component with a gap located between the remaining one splitter and the optical joint component;

reflective spatial light modulators for light modulation in accordance with a video signal, provided outside the optical system, as facing each light-passing plane of the second and the third splitters, a second polarizer provided as facing a light-emitting side plane of the fourth splitter, to allow only a second specific-linearly-polarized light component emitted from the light-emitting side plane of the fourth splitter to pass therethrough; and a projection lens provided as facing the second polarizer, to receive the second specific-linearly-polarized light component for image projection.

7. A projection display comprising:

a light source for emitting unlinearly-polarized light;

a first polarizer to allow only a first specific-linearly-polarized light component of the unlinearly-polarized light to pass therethrough;

a color-separating and -recombining optical system including cubic- or square column-like first to fourth polarization beam splitters having polarization-splitting planes intersecting each other like a character-"X", the first splitter being provided as facing the first polarizer, and wavelength-selective polarizing converters each for rotating the plane of polarization of a specific-color light component by 90 degrees, one of the converters being placed at a light-incident side of the first splitter, another of the converters being placed at a light-emitting side of the fourth splitter, the first and the fourth splitters being provided at a light-incident side and a light-emitting side, respectively, of the optical system, the first and the fourth splitters being arranged as diagonally opposing each other, and the remaining converters being placed between at least two inner facing planes of the first to the fourth splitters, wherein opto-elastic constants for the first to the fourth splitters have a relationship $K_i < K_m$ and $K_o$, $K_i$ and $K_m < K_o$ or $K_i < K_m < K_o$ in which $K_i$, $K_m$ and $K_o$ denote the opto-elastic constants for the first splitter, the second and the third splitters and the fourth splitter, respectively;

reflective spatial light modulators for light modulation in accordance with a video signal, provided outside the optical system, as facing each light-passing plane of the second and the third splitters, a second polarizer provided as facing a light-emitting side plane of the fourth splitter, to allow only a second specific-linearly-polarized light component emitted from the light-emitting side plane of the fourth splitter to pass therethrough; and a projection lens provided as facing the second polarizer, to receive the second specific-linearly-polarized light component for image projection.

* * * * *